(12) United States Patent
Nakamura et al.

(10) Patent No.: US 12,287,548 B2
(45) Date of Patent: Apr. 29, 2025

(54) DISPLAY DEVICE

(71) Applicant: Sharp Display Technology Corporation, Kameyama (JP)

(72) Inventors: Kimiaki Nakamura, Kameyama (JP); Masakazu Shibasaki, Kameyama (JP); Yasuhiro Haseba, Kameyama (JP); Koji Murata, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/691,293

(22) PCT Filed: Nov. 16, 2021

(86) PCT No.: PCT/JP2021/041992
§ 371 (c)(1),
(2) Date: Mar. 12, 2024

(87) PCT Pub. No.: WO2023/089650
PCT Pub. Date: May 25, 2023

(65) Prior Publication Data
US 2024/0377683 A1   Nov. 14, 2024

(51) Int. Cl.
*G02F 1/1343* (2006.01)
*G02F 1/133* (2006.01)
(Continued)

(52) U.S. Cl.
CPC ...... *G02F 1/13439* (2013.01); *G02F 1/13306* (2013.01); *G02F 1/1334* (2013.01); *G02F 1/133512* (2013.01); *G02F 1/13392* (2013.01)

(58) Field of Classification Search
CPC ............ G02F 1/13439; G02F 1/13306; G02F 1/1334; G02F 1/133512; G02F 1/13392;
(Continued)

(56) References Cited

U.S. PATENT DOCUMENTS

2013/0286334 A1* 10/2013 Satoh ................ G02B 26/005
359/290
2014/0240652 A1   8/2014 Satoh et al.
2016/0005353 A1   1/2016 Bennett

FOREIGN PATENT DOCUMENTS

KR    20140098504 A    8/2014
WO    2012/133417 A1   10/2012

OTHER PUBLICATIONS

Cheng-Chang Li et al., "High-image-quality Transparent Display based on AM-OLED with Cholesteric Liquid Crystal Back-panel", First published: May 30, 2018, SID2018 Digest 993-995.

* cited by examiner

*Primary Examiner* — Dung T Nguyen
*Assistant Examiner* — David Y Chung
(74) *Attorney, Agent, or Firm* — ScienBiziP, P.C.

(57) ABSTRACT

A display device includes: a plurality of first colored particles contained in a space between a first substrate and a second substrate; a light-emitting portion having a first light-emitting element provided on the first substrate, and a first-light-emitting-element driving circuit provided on the first substrate and configured to drive the first light-emitting element; a first transparent portion disposed in a direction along a main surface of the first substrate with respect to the light-emitting portion; a first electrode provided in the light-emitting portion; and a second electrode provided in the first transparent portion and being nckudestransparent. The display device is capable of switching between a light-transmitting state of the first transparent portion in which the first electrode attracts the plurality of first colored particles, and a light-blocking state of the first transparent portion in which the second electrode attracts the plurality of first colored particles.

14 Claims, 25 Drawing Sheets

(51) Int. Cl.
*G02F 1/1334* (2006.01)
*G02F 1/1335* (2006.01)
*G02F 1/1339* (2006.01)

(58) Field of Classification Search
CPC .......... G02F 1/165; G02F 1/166; G02F 1/167; G02F 1/16757; G02F 1/16761; G02F 1/1681
See application file for complete search history.

FIG. 1
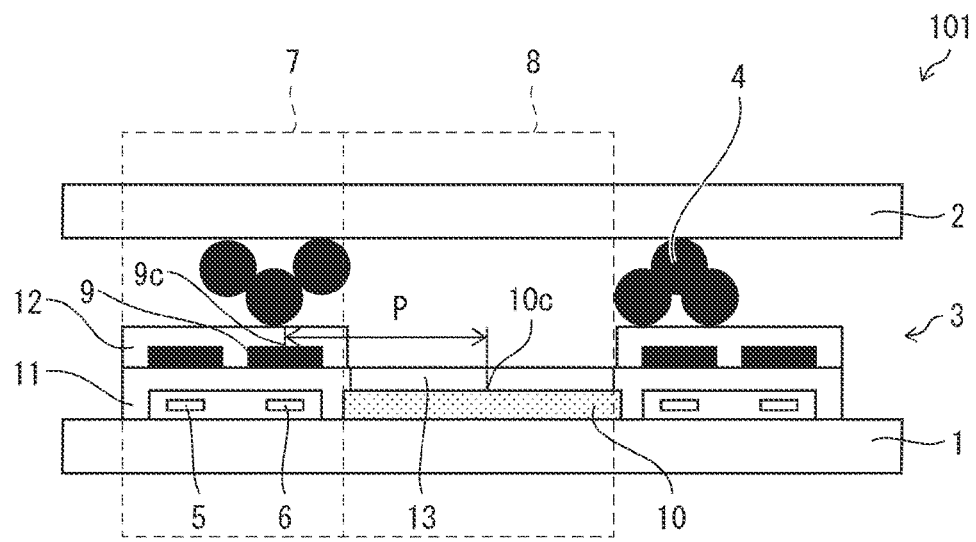
LIGHT-TRANSMITTING STATE OF
FIRST TRANSPARENT PORTION 8
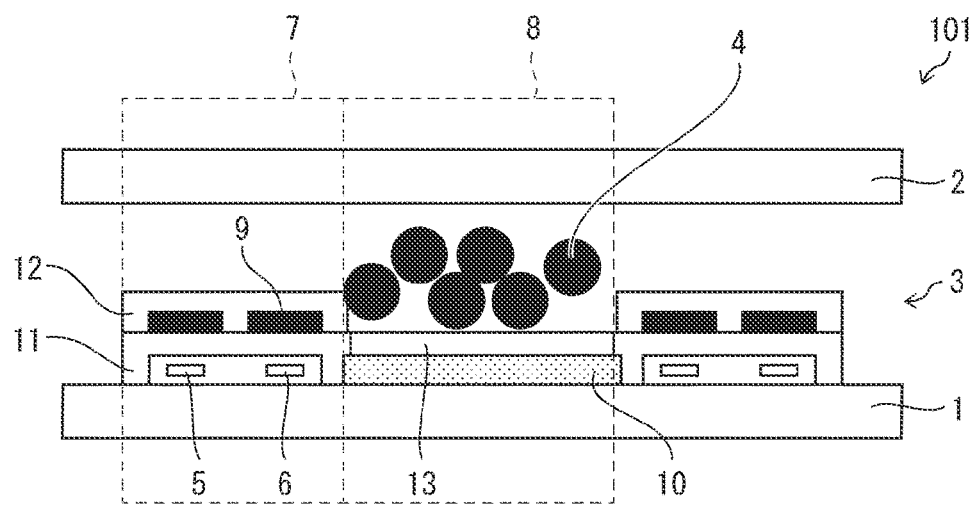
LIGHT-BLOCKING STATE OF
FIRST TRANSPARENT PORTION 8
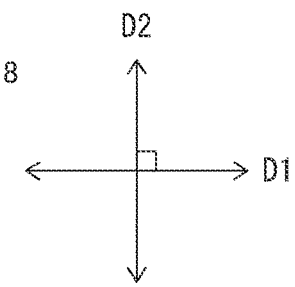

FIG. 6
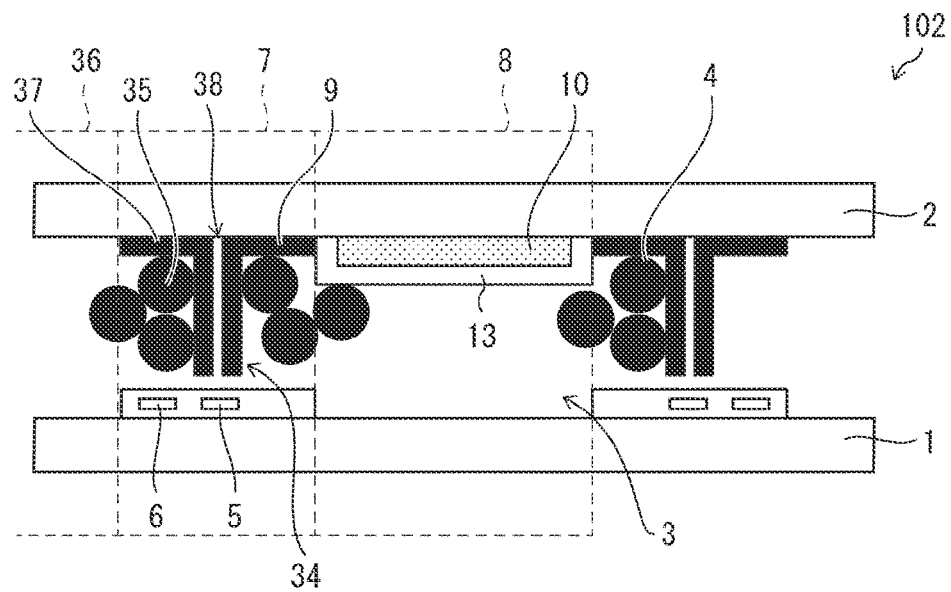
LIGHT-TRANSMITTING STATE OF
FIRST TRANSPARENT PORTION 8
LIGHT-TRANSMITTING STATE OF
SECOND TRANSPARENT PORTION 36
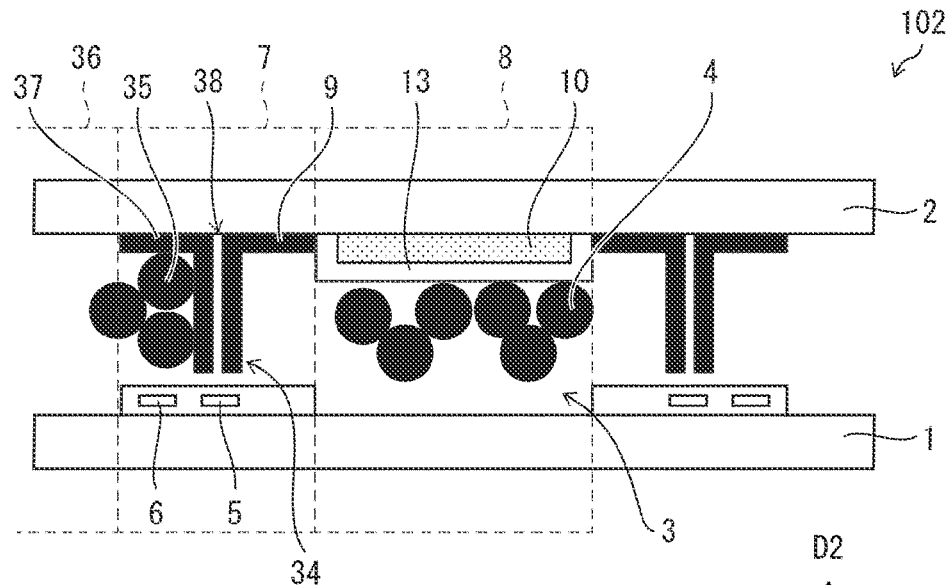
LIGHT-BLOCKING STATE OF
FIRST TRANSPARENT PORTION 8
LIGHT-TRANSMITTING STATE OF
SECOND TRANSPARENT PORTION 36
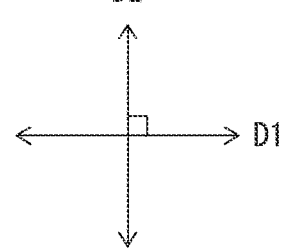

FIG. 9
(a)
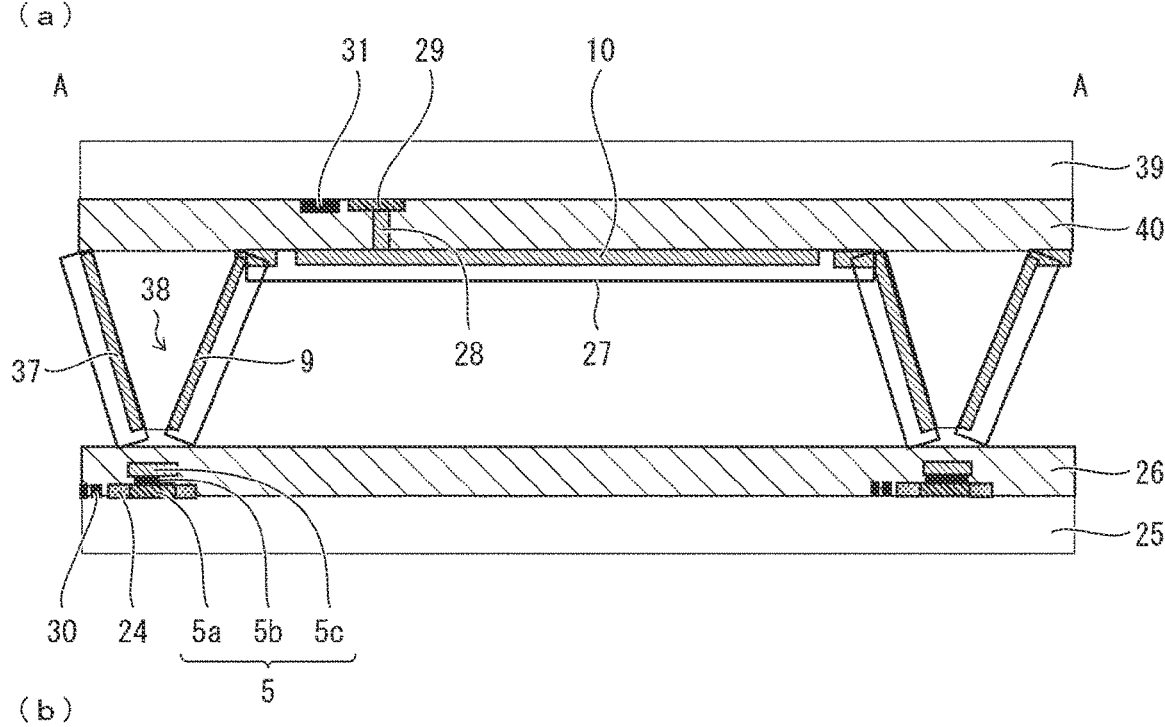
(b)
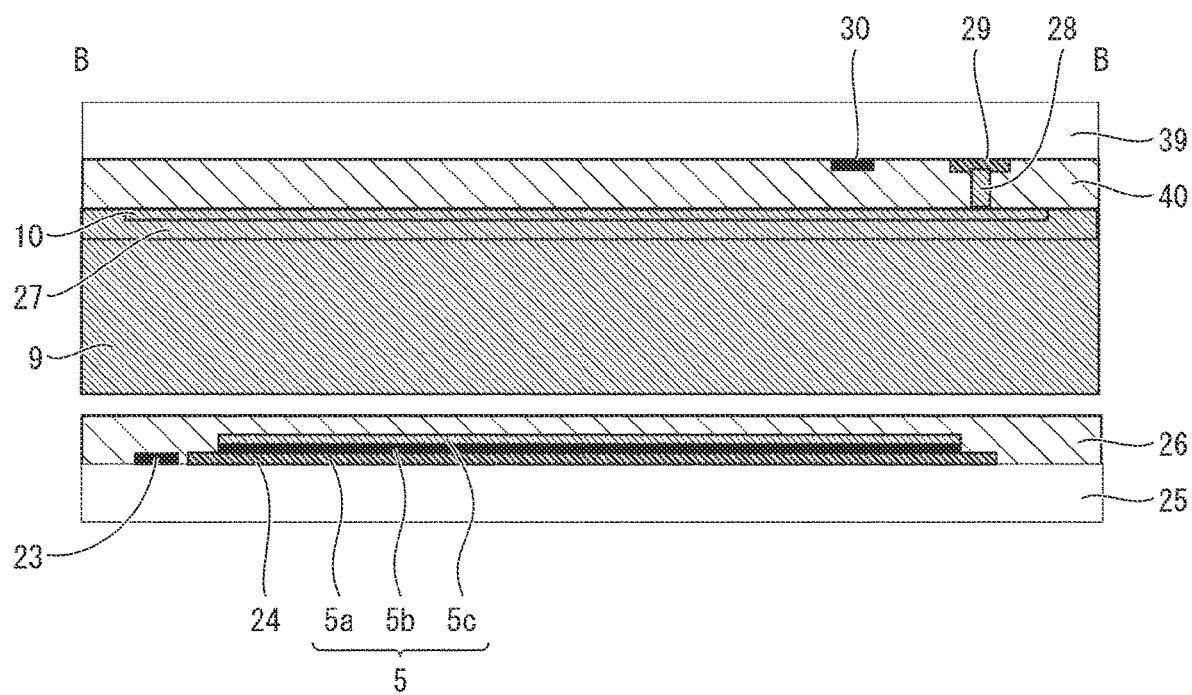

FIG. 11
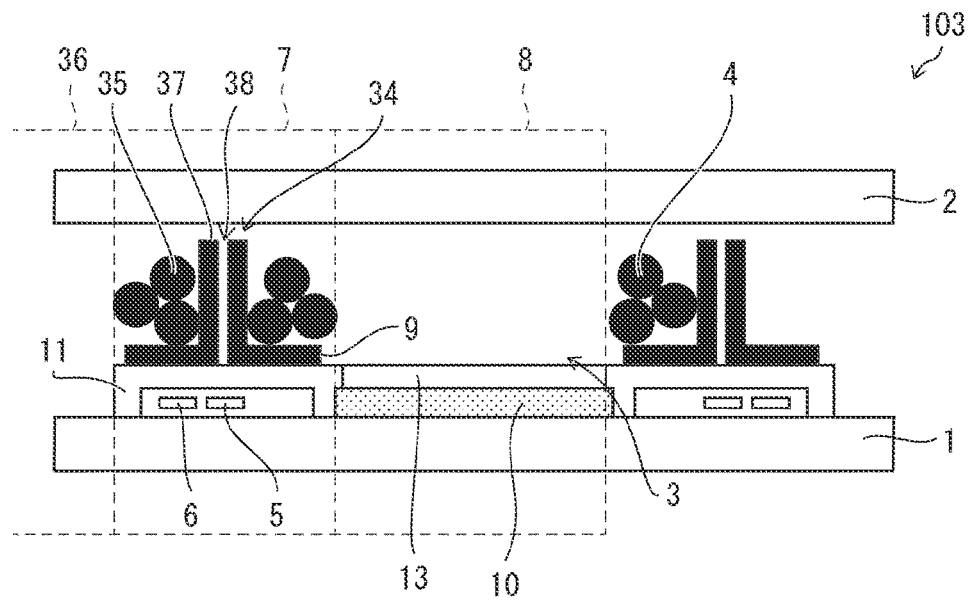
LIGHT-TRANSMITTING STATE OF
FIRST TRANSPARENT PORTION 8
LIGHT-TRANSMITTING STATE OF
SECOND TRANSPARENT PORTION 36
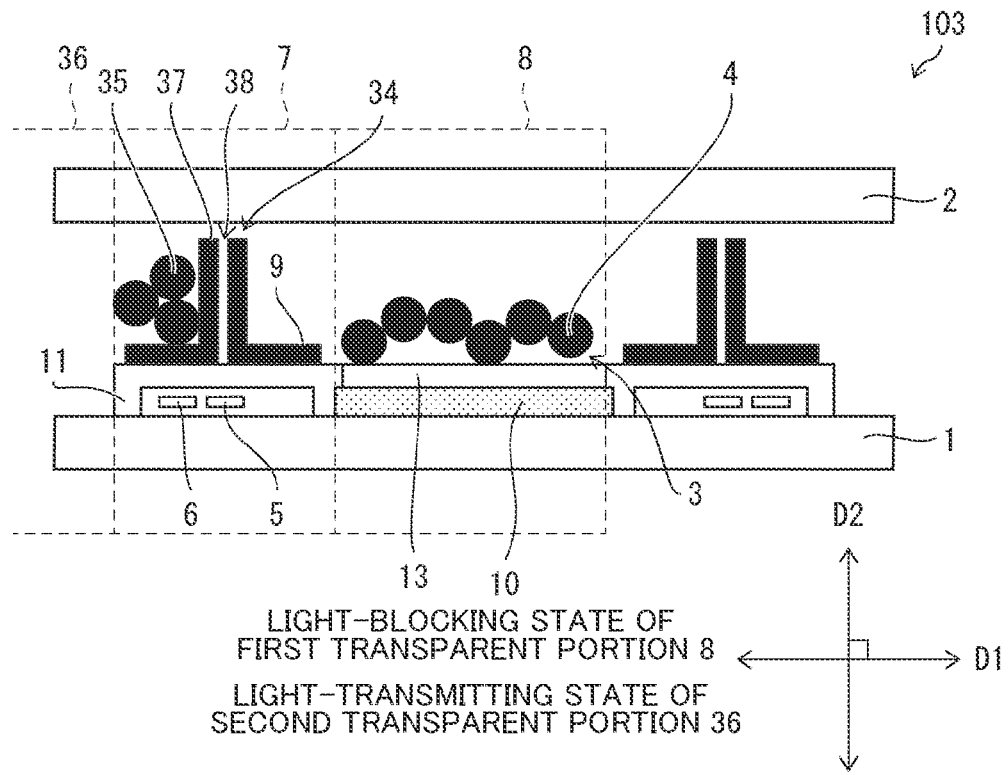
LIGHT-BLOCKING STATE OF
FIRST TRANSPARENT PORTION 8
LIGHT-TRANSMITTING STATE OF
SECOND TRANSPARENT PORTION 36

FIG. 13
(a)
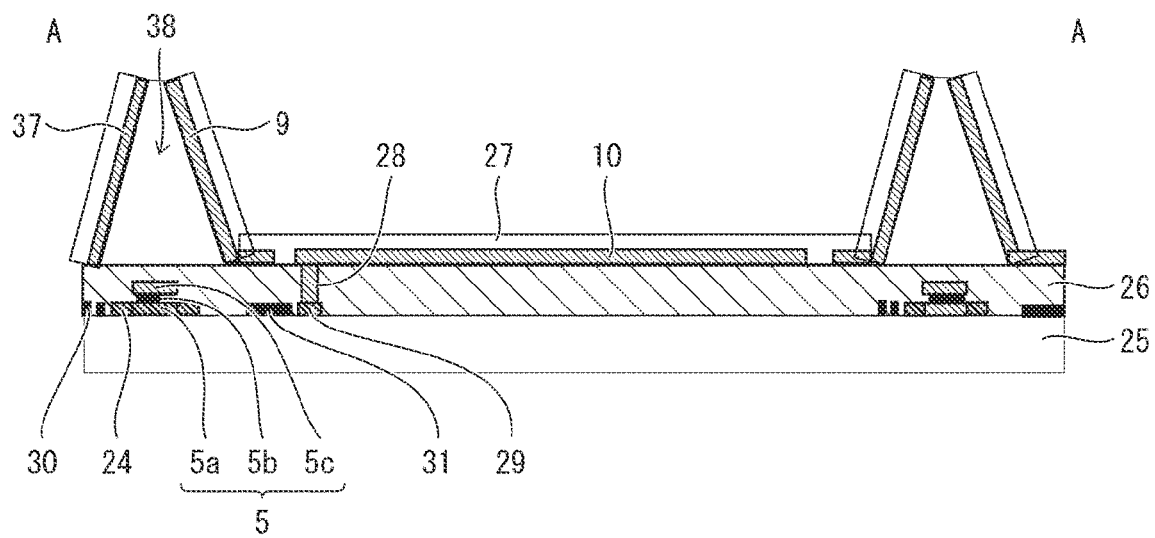
(b)
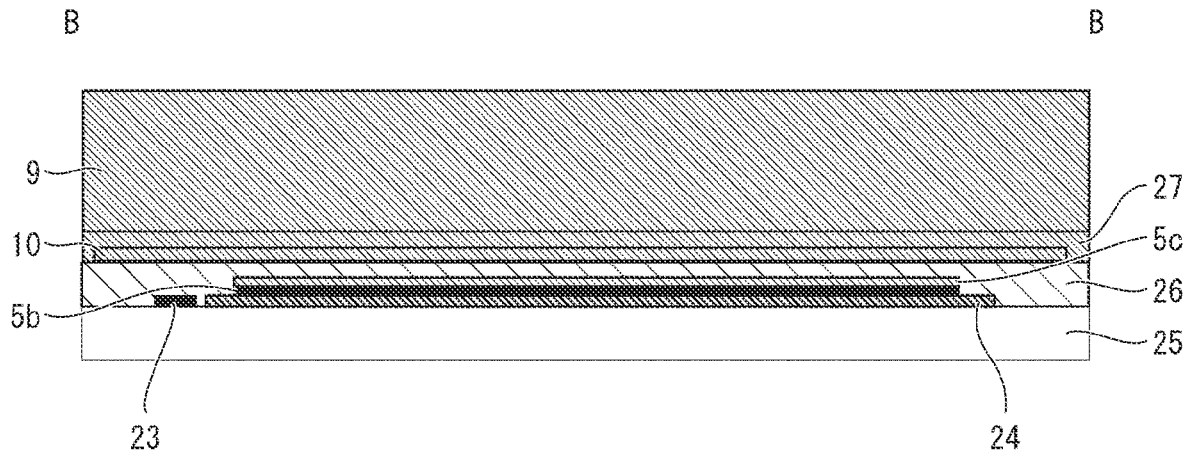

FIG. 14
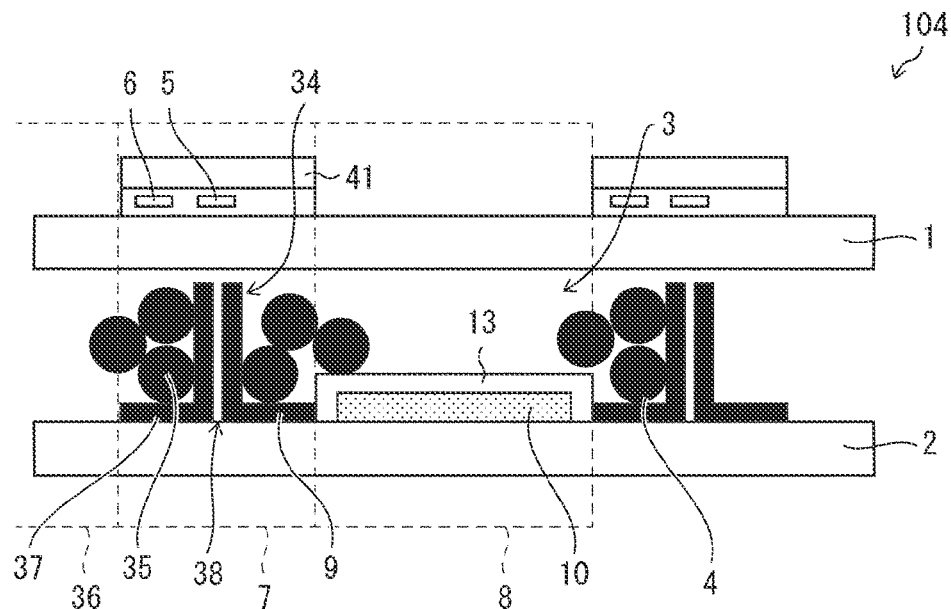
LIGHT-TRANSMITTING STATE OF
FIRST TRANSPARENT PORTION 8
LIGHT-TRANSMITTING STATE OF
SECOND TRANSPARENT PORTION 36
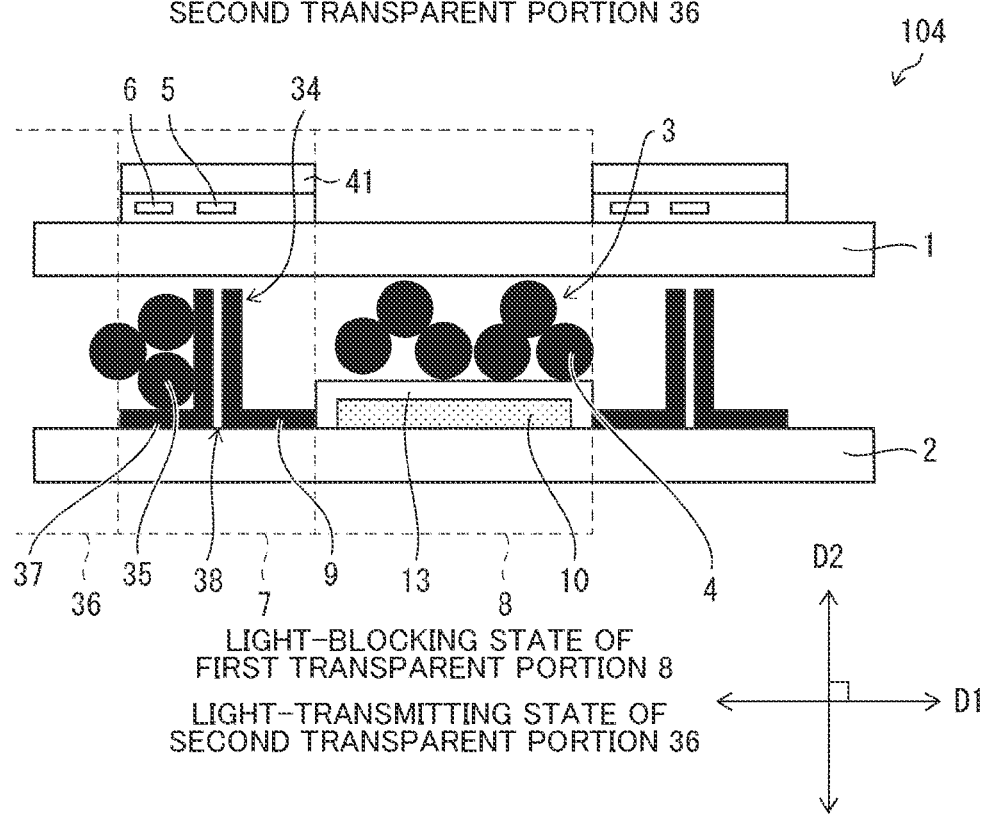
LIGHT-BLOCKING STATE OF
FIRST TRANSPARENT PORTION 8
LIGHT-TRANSMITTING STATE OF
SECOND TRANSPARENT PORTION 36

FIG. 17
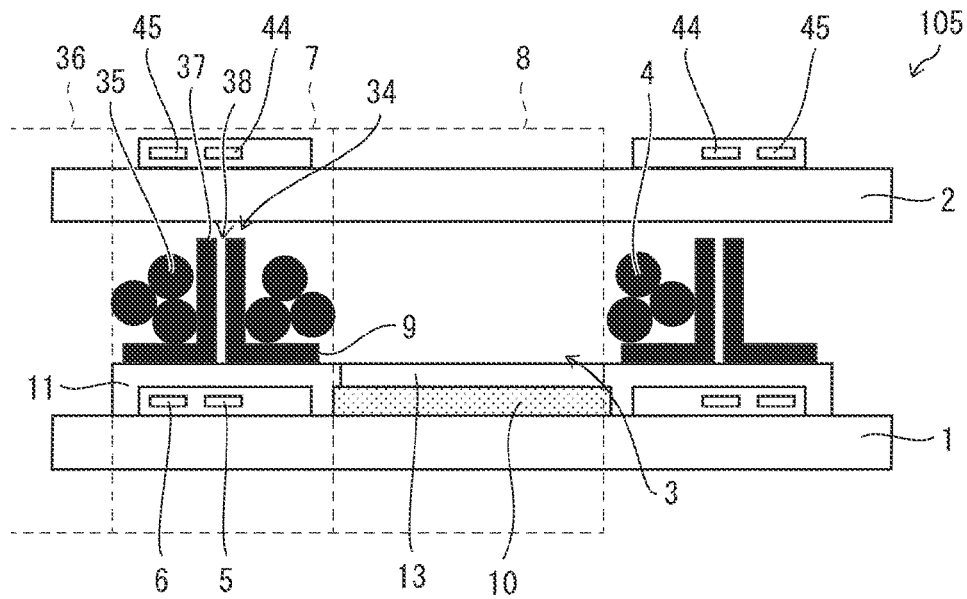
LIGHT-TRANSMITTING STATE OF
FIRST TRANSPARENT PORTION 8
LIGHT-TRANSMITTING STATE OF
SECOND TRANSPARENT PORTION 36
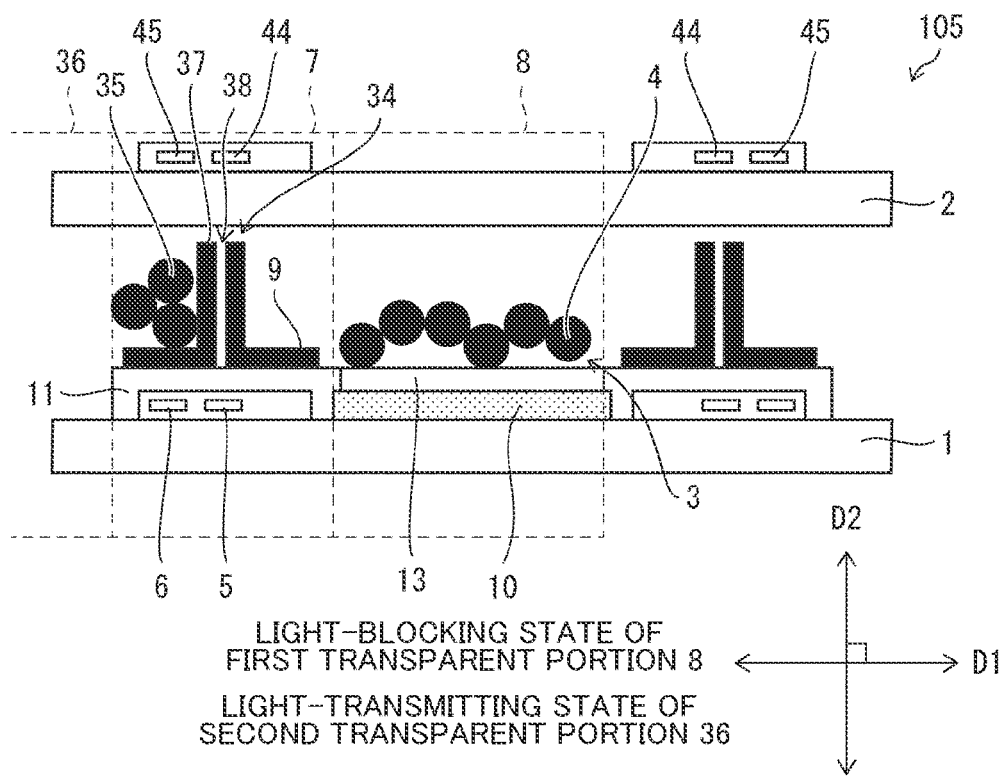
LIGHT-BLOCKING STATE OF
FIRST TRANSPARENT PORTION 8
LIGHT-TRANSMITTING STATE OF
SECOND TRANSPARENT PORTION 36

FIG. 20
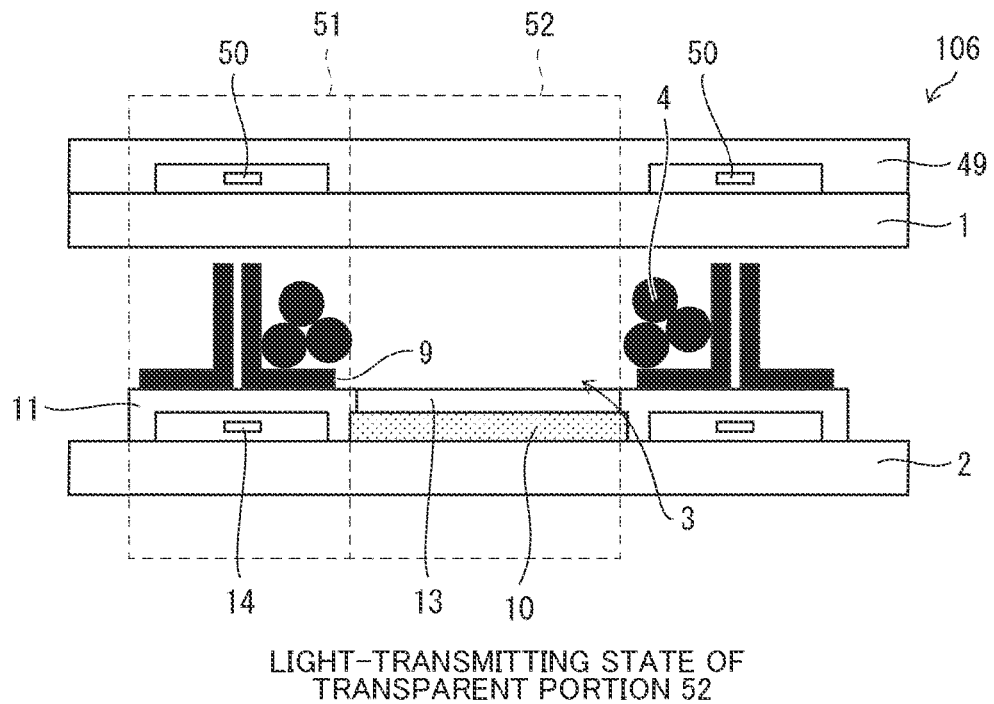
LIGHT-TRANSMITTING STATE OF
TRANSPARENT PORTION 52
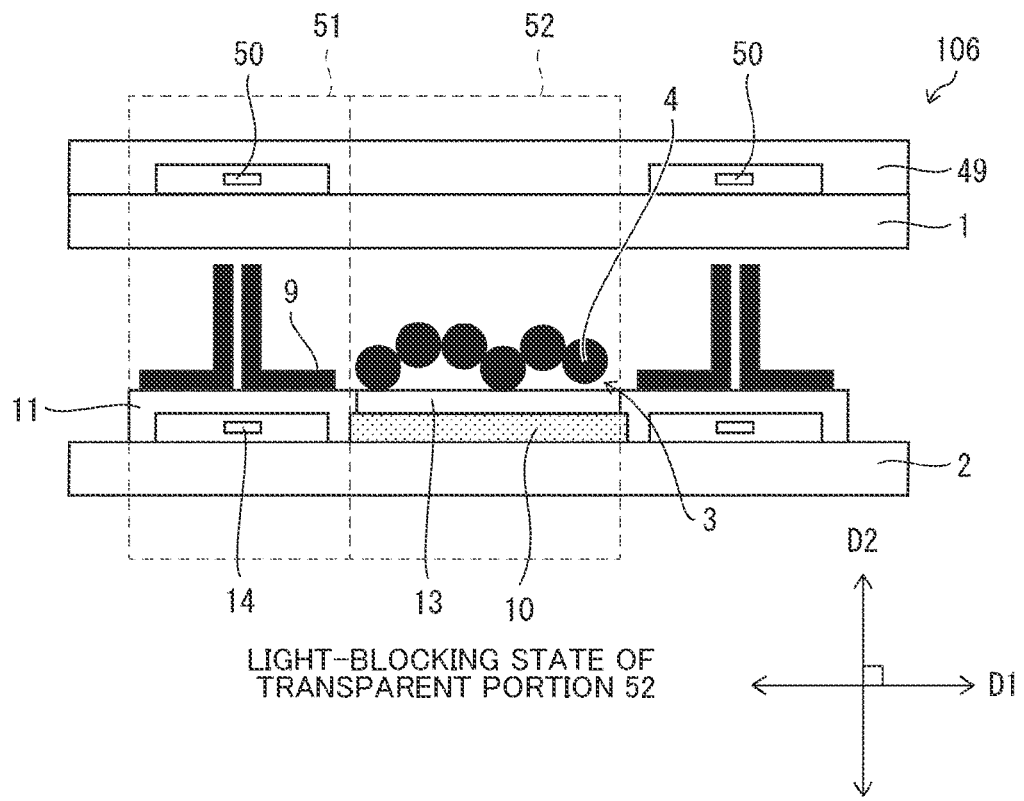
LIGHT-BLOCKING STATE OF
TRANSPARENT PORTION 52

DISPLAY DEVICE

TECHNICAL FIELD

The disclosure relates to a display device.

BACKGROUND ART

See-through display devices have been known in the related art.

CITATION LIST

Patent Literatures

Patent Literature 1: International Publication No. 2012/133417
Patent Literature 2: United States Unexamined Patent Application Publication No. 2016/0005353
Patent Literature 3: Korean Unexamined Patent Application Publication No. 10-2014-0098504

Non-Patent Literature

Non-Patent Literature 1: "High-image-quality Transparent Display based on AM-OLED with Cholesteric Liquid Crystal Back-panel", Cheng-Chang Li et. al., SID 2018 DIGEST 993-995

SUMMARY

Technical Problem

The known see-through display devices provide dark display. There are three reasons why this problem arises. Firstly, a components within the display device blocks much of light that is about to pass though the display device. Secondly, enhancing the luminance of light that is emitted from a light-emitting portion, by providing a reflective plate and other components in the light-emitting portion is structurally difficult. Thirdly, display visibility degrades due to mixture of light that is emitted by the display device and ambient light around the display device.

Solution to Problem

A display device according to one aspect of the disclosure includes the following: a first substrate and a second substrate facing each other; a plurality of first colored particles contained in a space between the first substrate and the second substrate; a light-emitting portion having a first light-emitting element provided on the first substrate, and a first-light-emitting-element driving circuit provided on the first substrate and configured to drive the first light-emitting element; a first transparent portion disposed in a direction along a main surface of the first substrate with respect to the light-emitting portion; a first electrode provided in the light-emitting portion; and a second electrode provided in the first transparent portion and being transparent, wherein the display device is capable of switching between a light-transmitting state of the first transparent portion in which the first electrode attracts the plurality of first colored particles, and a light-blocking state of the first transparent portion in which the second electrode attracts the plurality of first colored particles.

A display device according to one aspect of the disclosure includes the following: a first substrate and a second substrate facing each other; a plurality of colored particles contained in a space between the first substrate and the second substrate; a polymer-dispersed liquid crystal provided on the first substrate; a driving circuit portion provided on the first substrate, and having a liquid-crystal driving circuit configured to drive the polymer-dispersed liquid crystal; a transparent portion disposed in a direction along a main surface of the first substrate with respect to the driving circuit portion; a first electrode provided in the driving circuit portion; and a second electrode provided in the transparent portion and being transparent, wherein the display device is capable of switching between a light-transmitting state of the transparent portion in which the first electrode attracts the plurality of colored particles, and a light-blocking state of the transparent portion in which the second electrode attracts the plurality of colored particles.

Advantageous Effect of Disclosure

The aspects of the disclosure can achieve a display device with bright display.

BRIEF DESCRIPTION OF DRAWINGS

FIG. 1 is a schematic sectional view of a configuration of a light-emitting structure according to a first embodiment of the disclosure.

FIG. 6 is a schematic sectional view of a configuration of a light-emitting structure according to a second embodiment of the disclosure.

FIG. 9(a) is a sectional view taken along line A-A in FIG. 8 and corresponds to the light-emitting structure illustrated in FIG. 6, and FIG. 9(b) is a sectional view taken along line B-B in FIG. 8 and corresponding to the light-emitting structure illustrated in FIG. 6.

FIG. 11 is a schematic sectional view of a configuration of a light-emitting structure according to a third embodiment of the disclosure.

FIG. 13(a) is a sectional view taken along line A-A in FIG. 12, and FIG. 13(b) is a sectional view taken along line B-B in FIG. 12.

FIG. 14 is a schematic sectional view of a configuration of a light-emitting structure according to a fourth embodiment of the disclosure.

FIG. 17 is a schematic sectional view of a configuration of a light-emitting structure according to a fifth embodiment of the disclosure.

FIG. 20 is a schematic sectional view of a configuration of a light-emitting structure according to a sixth embodiment of the disclosure.

DESCRIPTION OF EMBODIMENTS

Figure 2:
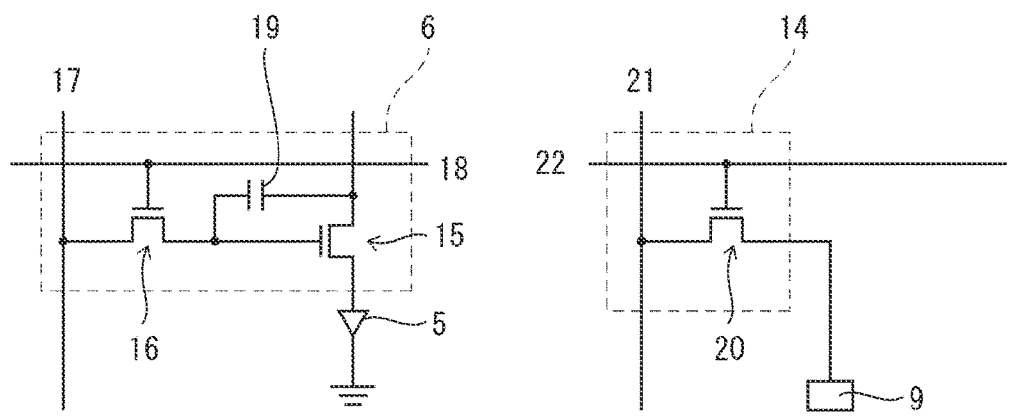
FIG. 2 illustrates an example circuit configuration in the light-emitting structure according to the first embodiment of the disclosure, including a first light-emitting element, a first-light-emitting-element driving circuit, a first electrode, and a first-electrode driving circuit.

Embodiments of the disclosure will be described below. It is noted that for convenience in description, components having the same functions as those of previously described components will be denoted by the same signs, and that their description will not be repeated in some cases.

First Embodiment

FIG. 1 is a schematic sectional view of a configuration of a light-emitting structure 101 according to a first embodiment of the disclosure. The light-emitting structure 101 is one of the main constituents of a see-through display device.

The light-emitting structure 101 includes the following: a first substrate 1 and a second substrate 2 facing each other; and a plurality of first colored particles 4 contained in a space 3 between the first substrate 1 and second substrate 2. The space 3 is filled with a transparent insulating liquid for instance.

The light-emitting structure 101 includes the following: a light-emitting portion 7 having a first light-emitting element 5 and a first-light-emitting-element driving circuit 6; and a first transparent portion 8. The first light-emitting element 5 is provided on the first substrate 1 and is preferably, but not limited to, a self-luminous element (e.g., an OLED, a QLED, and a μLED). In other words, a see-through display device provided with the light-emitting structure 101 is preferably, but not limited to, an OLED display device, a QLED display device, or a μLED display device. The first-light-emitting-element driving circuit 6 is a circuit provided on the first substrate 1, and that drives the first light-emitting element 5. The first transparent portion 8 is disposed in a first direction D1 along a main surface of the first substrate 1 with respect to the light-emitting portion 7. The main surface of the first substrate 1 is a surface of the first substrate 1 on which various components are mainly mounted, and in the light-emitting structure 101, it is a surface of the first substrate 1 adjacent to the space 3. Each of the light-emitting portion 7 and first transparent portion 8 includes one end to the other end of the light-emitting structure 101 in a second direction D2 substantially orthogonal to the main surface of the first substrate 1. Such a relation where the direction is substantially orthogonal to the main surface of the first substrate 1 includes a relation where the direction is deemed to be orthogonal to the main surface of the first substrate 1, as well as a relation where the direction is exactly orthogonal to the main surface of the first substrate 1.

The light-emitting structure 101 includes a first electrode 9 provided in the light-emitting portion 7, and a second electrode 10 provided in the first transparent portion 8 and being transparent. Examples of the material of the first electrode 9 include an opaque conductive film, such as a chromium film, and a transparent conductive film, such as an indium-tin-oxide (ITO) film. An example of the material of the second electrode 10 is a transparent conductive film, such as an ITO film. The second electrode 10 necessarily needs to be transparent, whereas the first electrode 9 does not necessarily need to be transparent. The first colored particles 4 have the physical property of being electrically chargeable and can be attracted by each of the driven first electrode 9 and driven second electrode 10.

The light-emitting structure 101 is capable of switching between a light-transmitting state of the first transparent portion 8, and a light-blocking state of the first transparent portion 8. The light-transmitting state of the first transparent portion 8 is a state in which the first electrode 9 attracts the plurality of first colored particles 4. The light-blocking state of the first transparent portion 8 is a state in which the second electrode 10 attracts the plurality of first colored particles 4.

In the light-transmitting state of the first transparent portion 8, the plurality of first colored particles 4 are not in the first transparent portion 8 at all or are scarcely in the first transparent portion 8; hence, light that is about to pass through the first transparent portion 8, which is inherently transparent, is not blocked by the plurality of first colored particles 4. That the light-emitting structure 101 can switch into the light-transmitting state of the first transparent portion 8 is a basis for the fact that the light-emitting structure 101 is one of the main constituents of a see-through display device.

In the light-blocking state of the first transparent portion 8, the plurality of first colored particles 4 are all or mostly in the first transparent portion 8; hence, light that is about to pass through the first transparent portion 8, which is inherently transparent, is blocked by the plurality of first colored particles 4 and thus does not pass through the first transparent portion 8.

The foregoing configuration can minimize components that can block light that is about to pass through the first transparent portion 8 during the light-transmitting state of the first transparent portion 8. Further, the light-emitting portion 7 does not necessarily need to be transparent in order to bring the first transparent portion 8 into the light-transmitting state; when the light-emitting portion 7 does not have to be transparent, the luminance of light emitted by the light-emitting portion 7 can be enhanced by providing a reflective plate and other components in the light-emitting portion 7. Accordingly, a see-through display device capable of bright display can be achieved.

Furthermore, using the plurality of first colored particles 4 as a material for switching between the light-transmitting state and light-blocking state of the first transparent portion 8 offers low electric power for moving this material and facilitates displacement control of the material when compared with an instance where a fluid is used as the material, and thus, this usage has the effect of capable of shortening switching time. One reason of why the material's displacement control is easy is that the first colored particles 4 are easy to move because they are much smaller in size than a fluid, which is a mass.

A pitch P between the first electrode 9 and second electrode 10 along the main surface of the first substrate 1 (i.e., in the first direction D) is preferably 80 µm or smaller and is more desirably 50 µm or smaller. This enables quick switching between the light-transmitting state and light-blocking state of the first transparent portion 8, thereby offering convenience in view of display contrast and high-speed responsibility in the light-emitting structure 101. It is noted that the pitch P is defined by the distance between a center 9c of the first electrode 9 along the main surface of the first substrate 1 and a center 10c of the second electrode 10 along the main surface of the first substrate 1.

Two of the plurality of first colored particles 4 move in mutually different directions during the switching between the light-transmitting state of the first transparent portion 8 and the light-blocking state of the first transparent portion 8. This is one of conspicuous differences between the plurality of first colored particles 4 as being a material for the switching between the light-transmitting state and light-blocking state of the first transparent portion 8, and a fluid as being this material.

The light-emitting structure 101 is produced in the expectation that the light-emitting portion 7 and the first transparent portion 8 are to be observed from the first substrate 1. In other words, the light-emitting structure 101 is a bottom-emission type, in which light emitted by the light-emitting portion 7 is taken out from a side on which the first substrate 1 is disposed. On the other hand, the light-emitting structure 101 may be a top-emission type, in which light emitted by the light-emitting portion 7 is taken out from a side on which the second substrate 2 is disposed (in other words, this light-emitting structure 101 is produced in the expectation that the light-emitting portion 7 and the first transparent portion 8 are to be observed from the second substrate 2).

The light-emitting structure 101 further includes an insulating layer 11 covering the first light-emitting element 5 and first-light-emitting-element driving circuit 6, an insulating layer 12 covering the first electrode 9, and an insulating layer 13 covering the second electrode 10 and being transparent. Each of the insulating layers 11 and 12 may or may not be transparent.

FIG. 2 illustrates an example circuit configuration in the light-emitting structure 101 including the first light-emitting element 5, the first-light-emitting-element driving circuit 6, the first electrode 9, and a first-electrode driving circuit 14. The first-electrode driving circuit 14 drives the first electrode 9 and is provided in the light-emitting structure 101.

Herein, the first light-emitting element 5 is described as being a self-luminous element. The first light-emitting element 5 has a cathode grounded. The first light-emitting element 5 has an anode connected to a power supply line, not shown, via a driving transistor 15. The driving transistor 15 has a gate connected to a signal line 17 via a writing transistor 16. The writing transistor 16 has a gate connected to a gate line 18. A capacitor 19 is connected between the driving transistor 15 and the writing transistor 16. The first-light-emitting-element driving circuit 6 has the driving transistor 15, the writing transistor 16, and the capacitor 19.

The first electrode 9 is connected to a signal line 21 via a transistor 20. The transistor 20 has a gate connected to a gate line 22. The first-electrode driving circuit 14 has the transistor 20. In accordance with combination of the ON-OFF control of the transistor 20 based on the potential of the gate line 22, and the potential of the signal line 21, the first-electrode driving circuit 14 can control whether the first electrode 9 attracts the plurality of first colored particles 4. For instance, when the potential of the first electrode 9 is positive, the first-electrode driving circuit 14 can control the first electrode 9 to attract the plurality of first colored particles 4.

Figure 3:
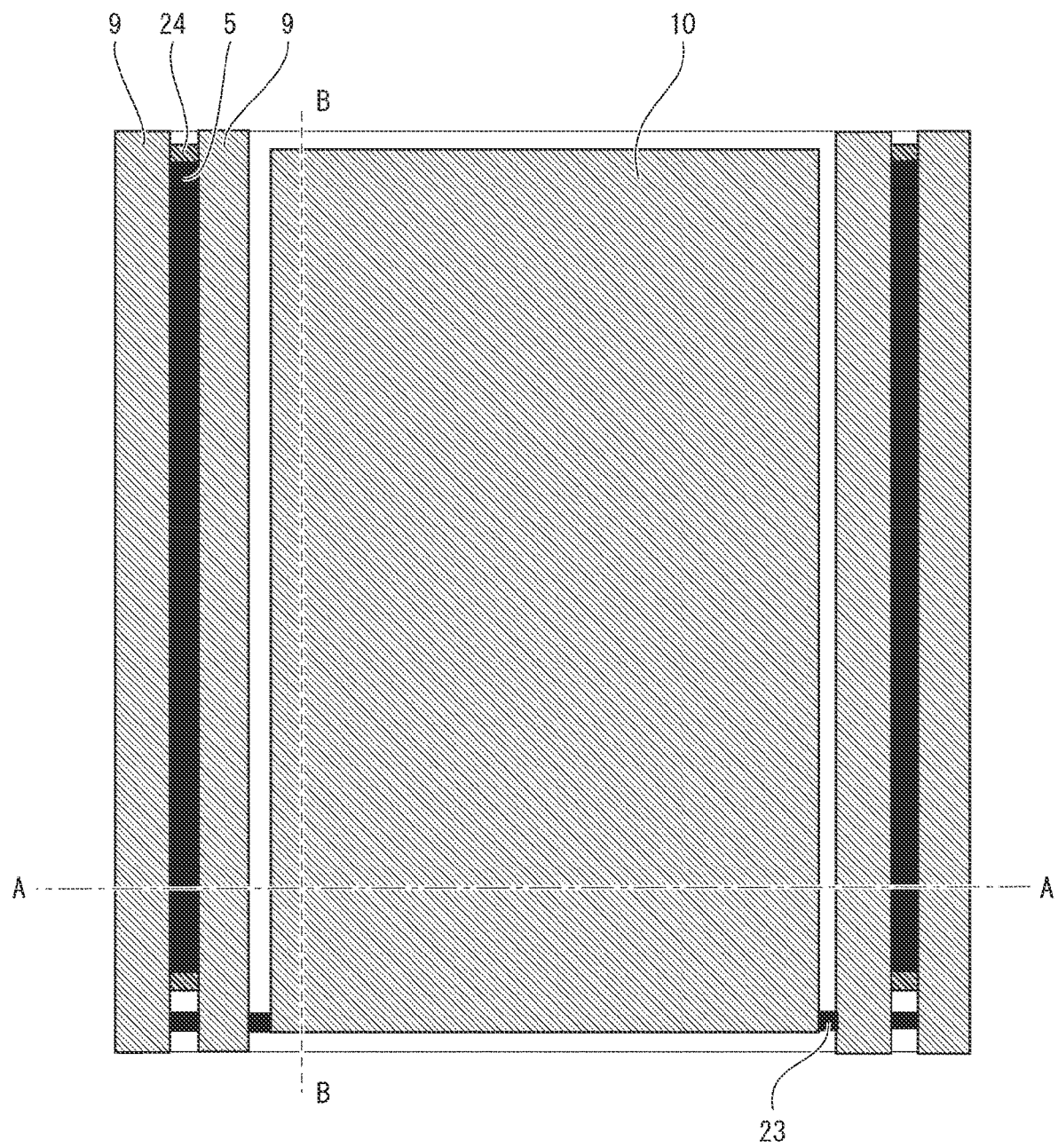
FIG. 3 is a plan view of an example configuration of the light-emitting structure according to the first embodiment of the disclosure.
Figure 4:
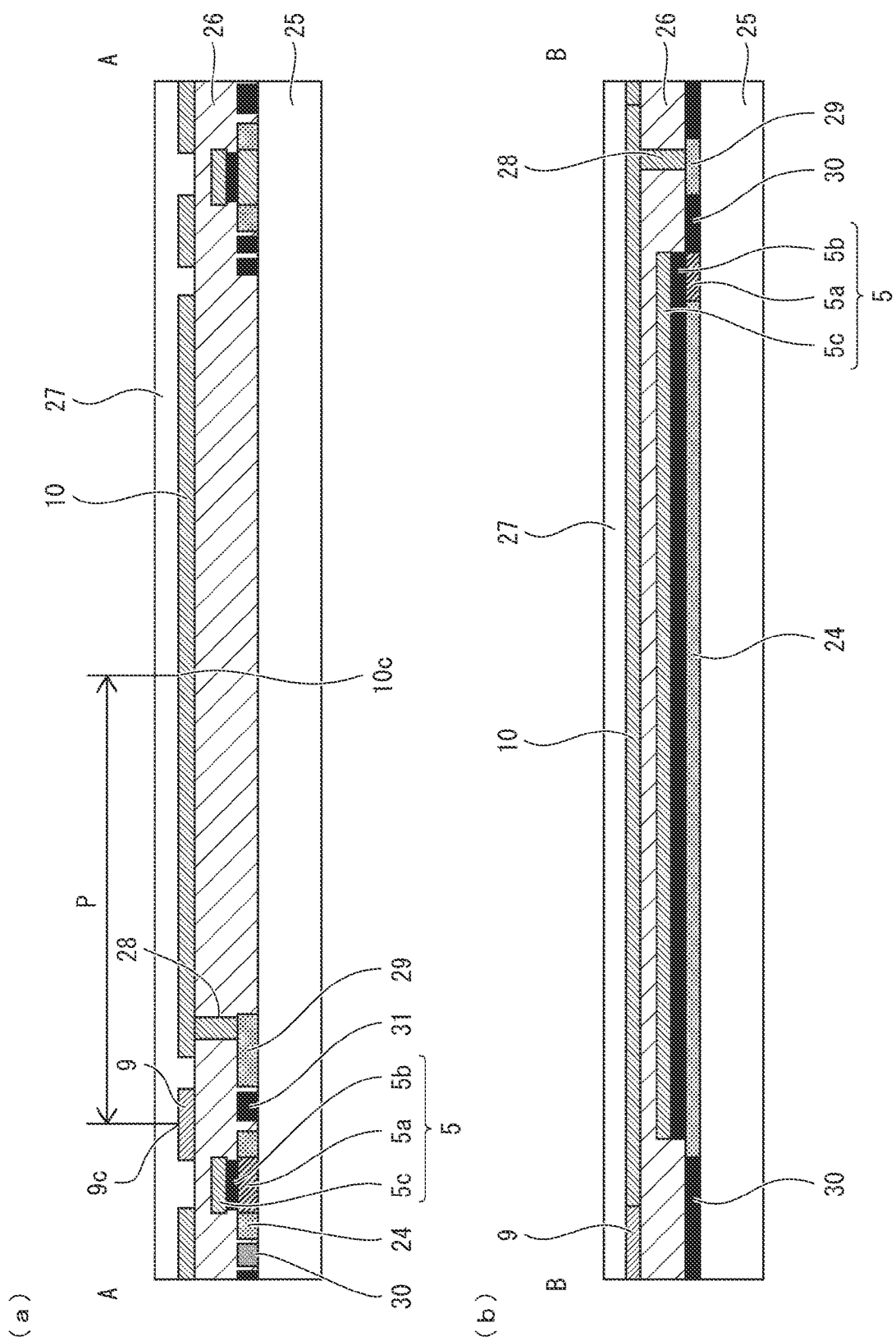
FIG. 4(a) is a sectional view taken along line A-A in FIG. 3.
FIG. 4(b) is a sectional view taken along line B-B in FIG. 3.

FIG. 3 is a plan view of an example configuration of the light-emitting structure 101. It is noted that the side-to-side direction in the individual plan views corresponds to the first direction D1 (see FIG. 1), a direction perpendicular to their drawing sheets corresponds to the second direction D2 (see FIG. 1). FIG. 4($a$) is a sectional view taken along line A-A in FIG. 3. and FIG. 4($b$) is a sectional view taken along line B-B in FIG. 3. The individual plan views illustrating an example configuration of light-emitting structures are views in the second direction D2 (see FIG. 1), which is substantially orthogonal to the main surface of the first substrate 1. FIG. 4($a$) and FIG. 4($b$) illustrate an example configuration of the first substrate 1 and individual components mounted thereon.

The second electrode 10 has a rectangular shape. The first electrode 9 is provided in the form of a stripe on both sides of the second electrode 10, two for each side. The first light-emitting element 5 overlaps the first electrode 9. In FIG. 3, component No. 23 denotes a gate bus line, and component No. 24 denotes a TFT.

As illustrated in FIG. 4($a$) and FIG. 4($b$), a base material 25, an insulating layer 26, the first electrode 9 and second electrode 10, and an insulating layer 27 are stacked in the stated order. The insulating layers 26 and 27 are both transparent. The insulating layer 26 has a through-hole 28, via which the second electrode 10 and a TFT 29 are connected together. The first light-emitting element 5 has an anode 5$a$ connected to a TFT 24, an electroluminescence layer 5$b$, and a cathode 5$c$. The electroluminescence layer 5$b$ overlaps the anode 5$a$ and the TFT 24. In FIG. 4($a$) and FIG. 4($b$), component No. 30 denotes a source bus line, and component No. 31 denotes a source bus line for the second electrode 10. The base material 25 with the TFTs 24 and 29 and other components formed thereon corresponds to the first substrate 1.

For the pitch P to measure 50 µm or smaller, the driving circuits and a light-emitting circuit need to be long and narrowly formed perpendicularly to the first light-emitting element 5. Accordingly, it is desirable to form the first electrode 9 and first-electrode driving circuit 14 (see FIG. 2) in a pair for each of RGB pixels. This can enhance transmittance during single-color display.

The TFT 29 is typically provided on the first substrate 1, as illustrated in FIG. 4($a$) and FIG. 4($b$). On the other hand, no TFT is preferably formed on the second substrate 2. This can reduce the cost for the second substrate 2.

Figure 5:
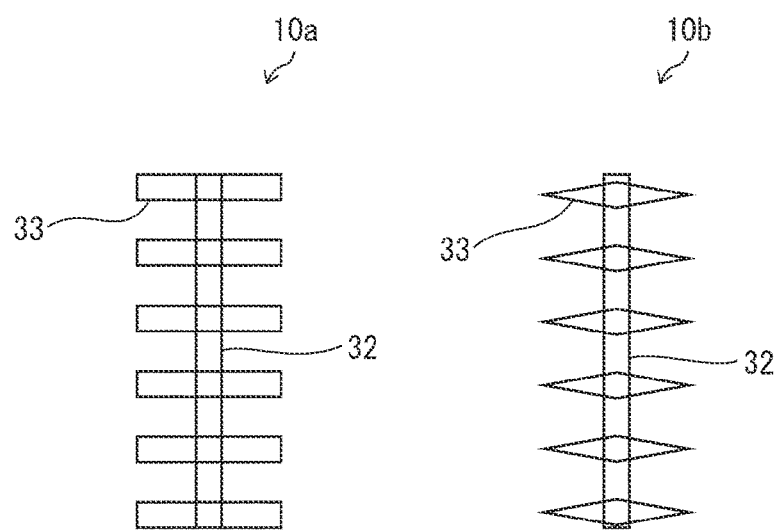
FIG. 5 is a plan view of a modification of a second electrode.

FIG. 5 is a plan view of second electrodes 10a and 10b, which are modifications of the second electrode 10. The plan view in FIG. 5 is a view in the second direction D2 (see FIG. 1), which is substantially orthogonal to the main surface of the first substrate 1. Like the second electrodes 10a and 10b, the second electrode 10 may be a fishbone electrode. To be specific, the shape of each of the second electrodes 10a and 10b viewed in the second direction D2 includes a trunk 32 and branches 33 branched from the trunk 32. Each of the second electrodes 10a and 10b is provided with a plurality of branches 33 on both sides extending from the center, the trunk 32. The branches 33 of the second electrode 10a in the second direction D2 are rectangular, and the branches 33 of the second electrode 10b in the second direction D2 are triangular. This enables the plurality of first colored particles 4 to be uniformly dispersed on the basis of the mechanism disclosed in the following document. The second electrode 10a or 10b can be used instead of the second electrode 10 not only in the light-emitting structure 101, but also in all light-emitting structures.

Document: Japanese Unexamined Patent Application Publication No. 2013-254162

Second Embodiment

FIG. 6 is a schematic sectional view of a configuration of a light-emitting structure 102 according to a second embodiment of the disclosure. Differences between the light-emitting structure 102 and the light-emitting structure 101 will be mainly described.

The light-emitting structure 102 is structured such that the light-emitting portion 7 has a protrusion 34 protruding in the second direction D2, which is substantially orthogonal to the main surface of the first substrate 1, in the space 3. The protrusion 34, which functions as a partition, can prevent the plurality of first colored particles 4 from moving opposite the first transparent portion 8 with respect to the light-emitting portion 7. This enables the plurality of first colored particles 4 to be dispersed with a suitable distribution in the space 3 within the light-emitting structure 102.

The protrusion 34 includes at least a part of the first electrode 9. Forming the protrusion 34 by the use of at least a part of the first electrode 9 can achieve the light-emitting structure 102 with a small number of components.

The light-emitting structure 102 includes the following: a plurality of second colored particles 35 contained in the space 3; a second transparent portion 36 disposed opposite the first transparent portion 8 with respect to the light-emitting portion 7; and a third electrode 37 provided in the light-emitting portion 7. The second colored particles 35, the second transparent portion 36, and the third electrode 37 respectively have a configuration similar to that of the first colored particles 4, a configuration similar to that of the first transparent portion 8, and a configuration similar to that of the first electrode 9. Moreover, the light-emitting structure 102 is capable of switching into a light-transmitting state of the second transparent portion 36 in which the third electrode 37 attracts the plurality of second colored particles 35.

An example circuit configuration in the light-emitting structure 102 including the first light-emitting element 5, the first light-emitting-element driving circuit 6, the first electrode 9, and the first-electrode driving circuit 14 is the same as that illustrated in FIG. 2. The light-emitting structure 102 is structured such that the first light-emitting element 5 and the first-light-emitting-element driving circuit 6 are provided on the first substrate 1, and that the first electrode 9 and the first-electrode driving circuit 14 are provided on the second substrate 2.

Figure 7:
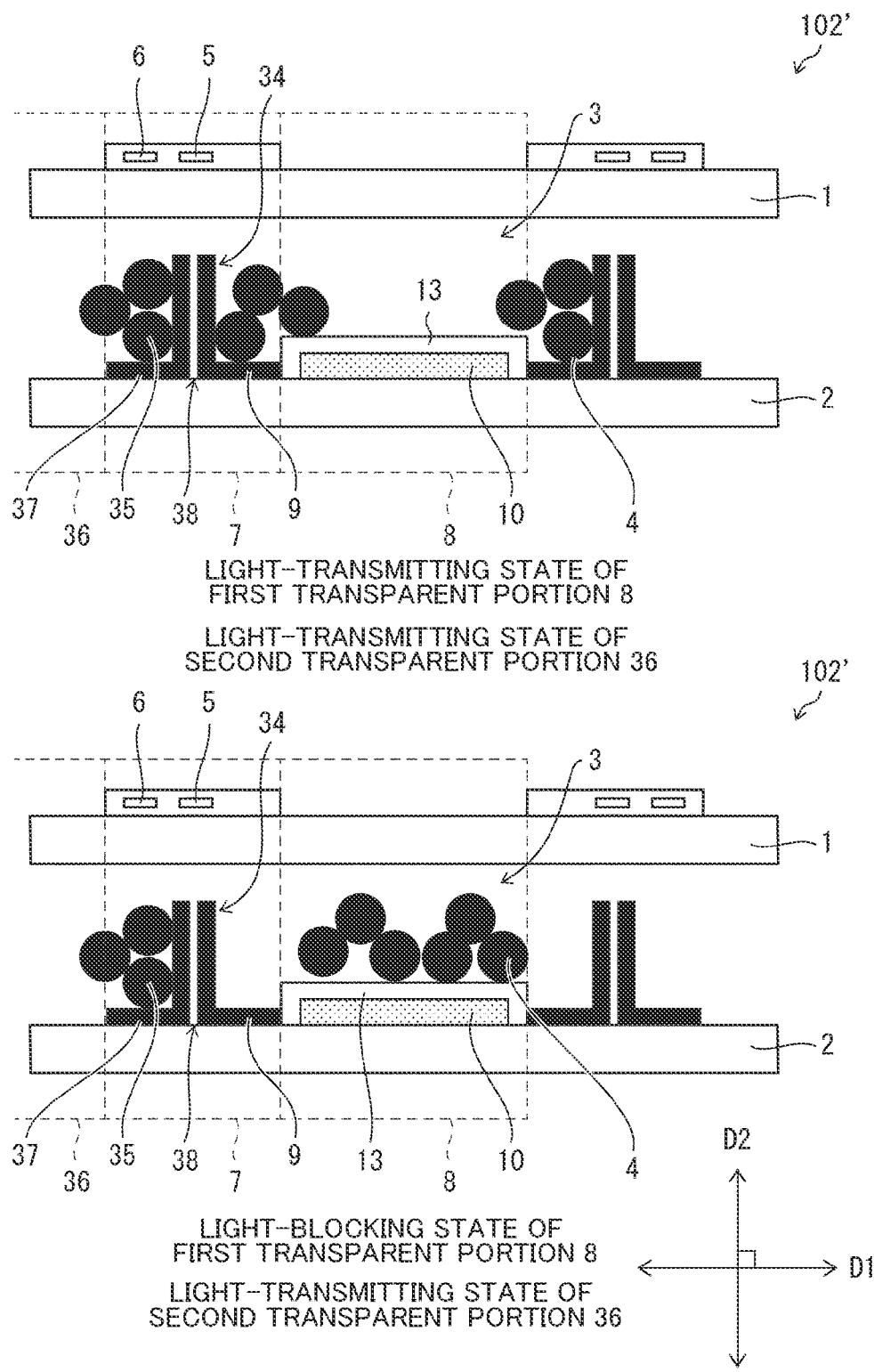
FIG. 7 is a schematic sectional view of a configuration of another light-emitting structure according to the second embodiment of the disclosure.

FIG. 7 is a schematic sectional view of a configuration of a light-emitting structure 102' according to the second embodiment of the disclosure. Differences between the light-emitting structure 102' and the light-emitting structure 102 will be mainly described.

The light-emitting structure 102' is structured, when compared with the light-emitting structure 102, such that the second substrate 2 per se is turned upside down, and that the positional relationship between the first substrate 1 and second substrate 2 is inverted.

Figure 8:
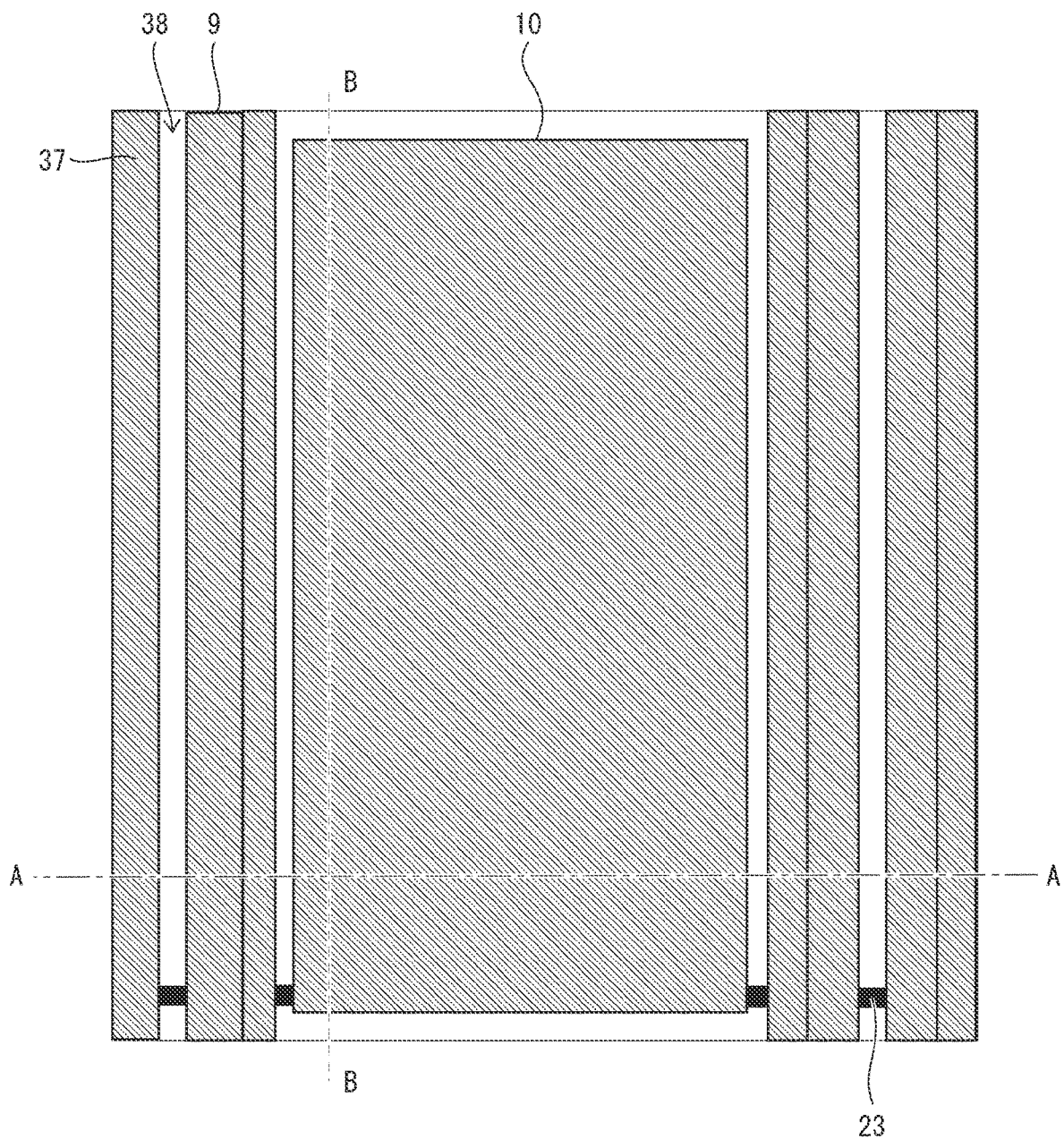
FIG. 8 is a plan view of an example configuration of the light-emitting structure according to the second embodiment of the disclosure.
Figure 10:
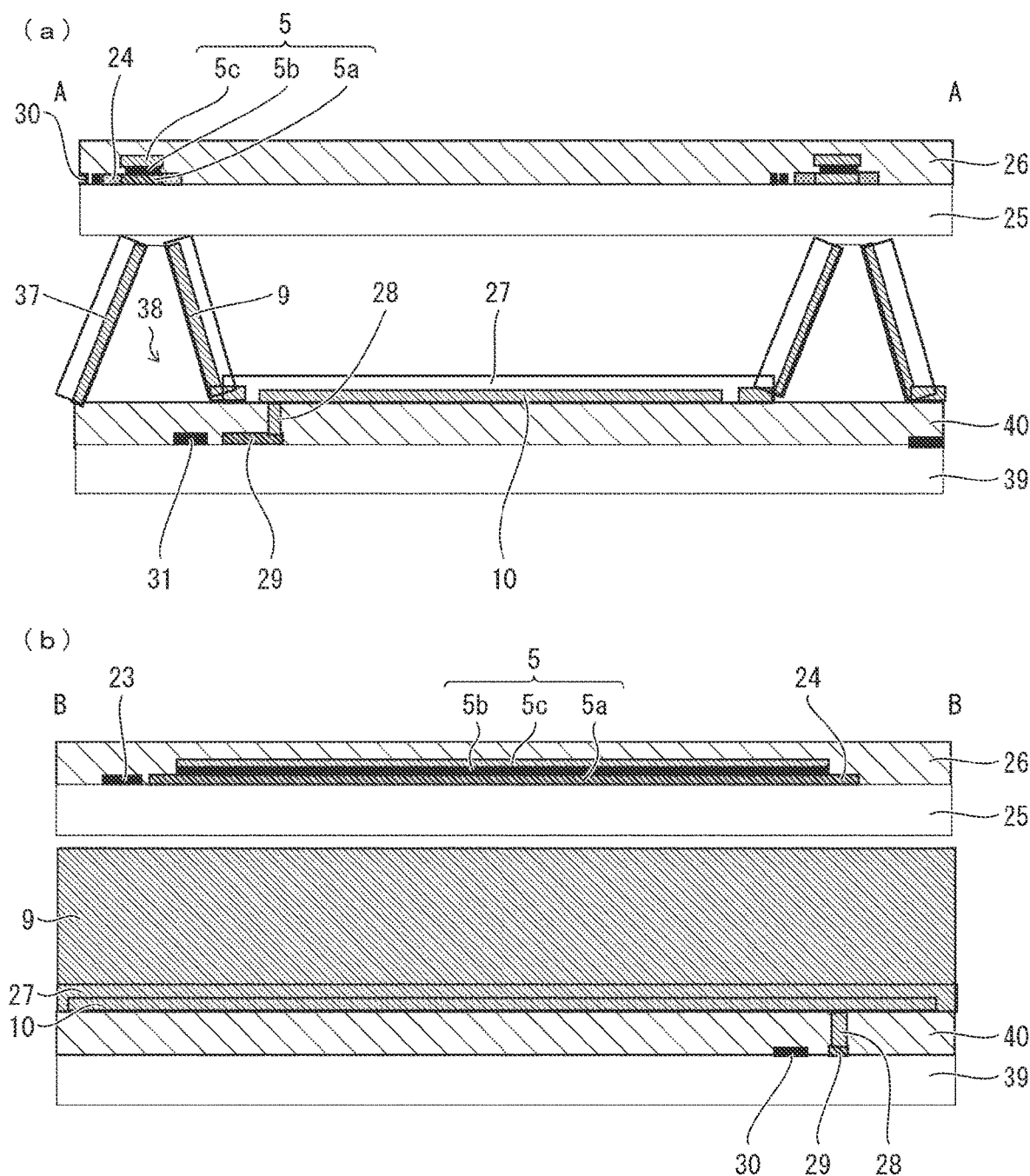
FIG. 10(a) is a sectional view taken along line A-A in FIG. 8 and corresponds to the light-emitting structure illustrated in FIG. 7.
FIG. 10(b) is a sectional view taken along line B-B in FIG. 8 and corresponds to the light-emitting structure illustrated in FIG. 7.

FIG. 8 is a plan view of an example configuration of each of the light-emitting structures 102 and 102'. FIG. 9(a) is a sectional view taken along line A-A in FIG. 8 and corresponds to the light-emitting structure 102, and FIG. 9(b) is a sectional view taken along line B-B in FIG. 8 and corresponds to the light-emitting structure 102. FIG. 10(a) is a sectional view taken along line A-A in FIG. 8 and corresponds to the light-emitting structure 102', and FIG. 10(b) is a sectional view taken along line B-B in FIG. 8 and corresponds to the light-emitting structure 102'. FIG. 9(a), FIG. 9(b), FIG. 10(a), and FIG. 10(b) each illustrate an example configuration of the first substrate 1 and second substrate 2 as well as the individual components mounted thereon.

The first electrode 9 and third electrode 37 are provided in the form of a strip on both sides of the second electrode 10, one for each side. Like the light-emitting structure 101, the light-emitting structures 102 and 102' are each also structured such that the second electrode 10 and the TFT 29 are connected together via the through-hole 28. The second electrode 10, the through-hole 28, and the TFT 29 are formed on and in a base material 39 and an insulating layer 40. The base material 39 with the TFT 29 and other components formed thereon corresponds to the second substrate 2.

The light-emitting structures 102 and 102' are each structured such that a space 38 between the first electrode 9 and the third electrode 37 is formed in the second direction D2, which is substantially orthogonal to the main surface of the first substrate 1 with respect to the first light-emitting element 5. This can prevent light emitted by the first light-emitting element 5 from passing through the first electrode 9 and/or the third electrode 37 and can thus reduce a loss of the light within the light-emitting structure. Resin, such as acrylic, for instance may be provided in the space 38.

The first substrate 1 preferably has a thickness of 20 μm or smaller and more desirably has a thickness of 10 μm or smaller. This can reduce parallax in the light-emitting structure 102' that results from the thickness of the first substrate 1. An example method of setting the thickness of the first substrate 1 at 20 μm or smaller is a laser liftoff (LLO) process.

Third Embodiment

FIG. 11 is a schematic sectional view of a configuration of a light-emitting structure 103 according to a third embodiment of the disclosure. Differences between the light-emitting structure 103 and the light-emitting structure 102 will be mainly described.

The light-emitting structure 103 is structured such that the first-electrode driving circuit 14 (see FIG. 2), which drives the first electrode 9, is provided on the first substrate 1. An example circuit configuration in the light-emitting structure 103 including the first light-emitting element 5, the first-light-emitting-element driving circuit 6, the first electrode 9, and the first-electrode driving circuit 14 is the same as that illustrated in FIG. 2. The light-emitting structure 103 is structured such that the first light-emitting element 5, the first-light-emitting-element driving circuit 6, the first electrode 9, and the first-electrode driving circuit 14 are all provided on the first substrate 1. The absence of TFTs on the second substrate 2 can reduce the cost for the second substrate 2.

Figure 12:
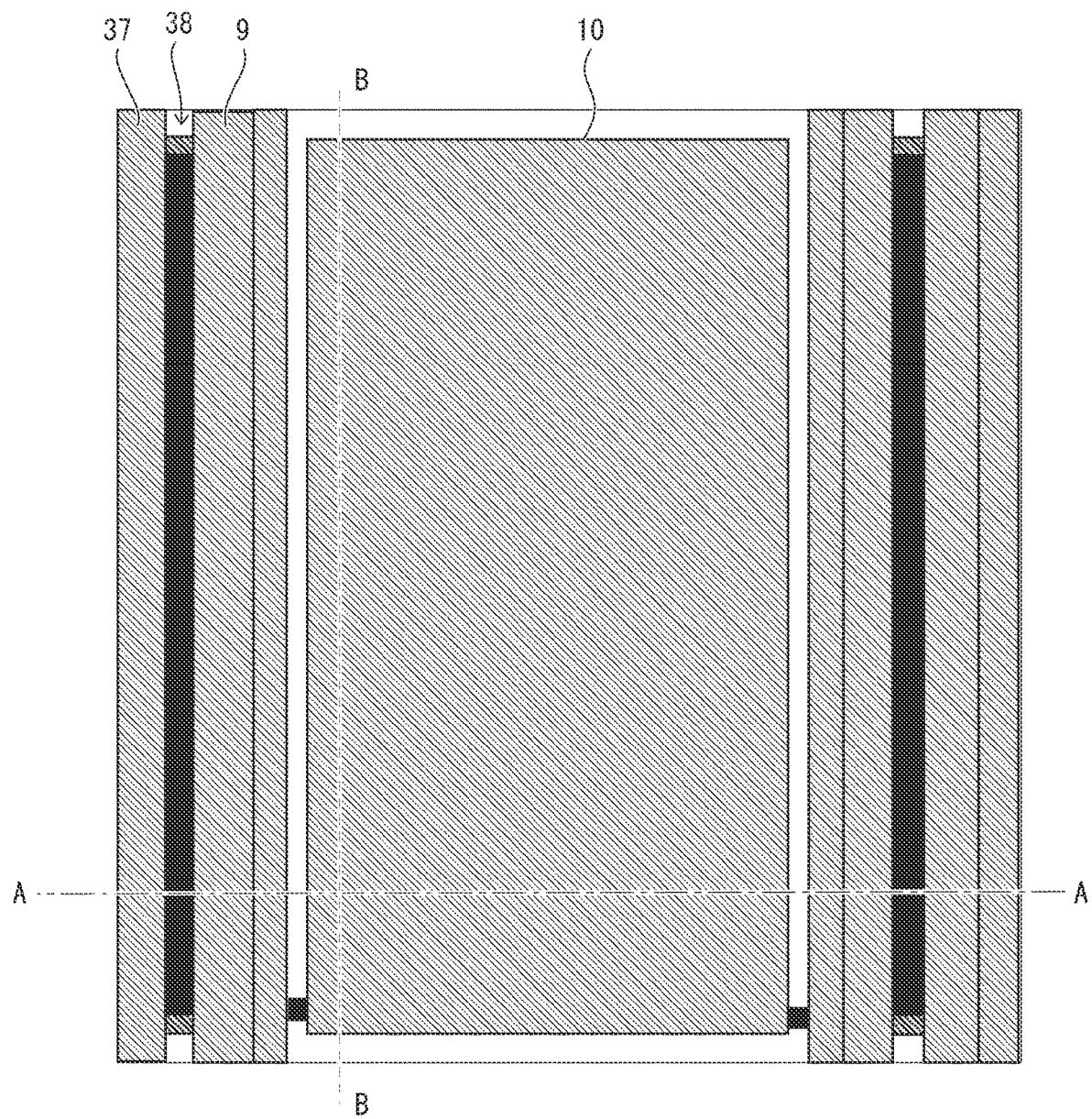
FIG. 12 is a plan view of an example configuration of the light-emitting structure according to the third embodiment of the disclosure.

FIG. 12 is a plan view of an example configuration of the light-emitting structure 103. FIG. 13(a) is a sectional view taken along line A-A in FIG. 12, and FIG. 13(b) is a sectional view taken along line B-B in FIG. 12. FIG. 13(a) and FIG. 13(b) illustrate an example configuration of the first substrate 1 and the individual components mounted thereon.

Like the light-emitting structure 102, the light-emitting structure 103 is also structured such that the second electrode 10 and the TFT 29 are connected together via the through-hole 28. The TFT 29 is formed on the base material 25, and the second electrode 10 and the through-hole 28 are formed on and in the insulating layer 26.

Fourth Embodiment

FIG. 14 is a schematic sectional view of a configuration of a light-emitting structure 104 according to a fourth embodiment of the disclosure. Differences between the light-emitting structure 104 and the light-emitting structure 102' will be mainly described.

The light-emitting structure 104 is structured such that the light-emitting portion 7 has an optical member 41 for enhancing the contrast of light emitted by the first light-emitting element 5, in addition to the first light-emitting element 5 and first-light-emitting-element driving circuit 6. Examples of the optical member 41 include a layer having a function similar to that of a polarizing plate (hereinafter, also referred to as a polarizing layer), a layer having a function similar to that of a λ/4 wavelength plate (hereinafter, also referred to as a λ/4 wavelength layer), and a color filter. This can enhance the contrast of light emitted by the first light-emitting element 5.

An example circuit configuration in the light-emitting structure 104 including the first light-emitting element 5, the first-light-emitting-element driving circuit 6, the first electrode 9, and the first-electrode driving circuit 14 is the same as that illustrated in FIG. 2. The light-emitting structure 104 is structured such that the first light-emitting element 5 and the first-light-emitting-element driving circuit 6 are provided on the first substrate 1, and the first electrode 9 and the first-electrode driving circuit 14 are provided on the second substrate 2.

Figure 15:
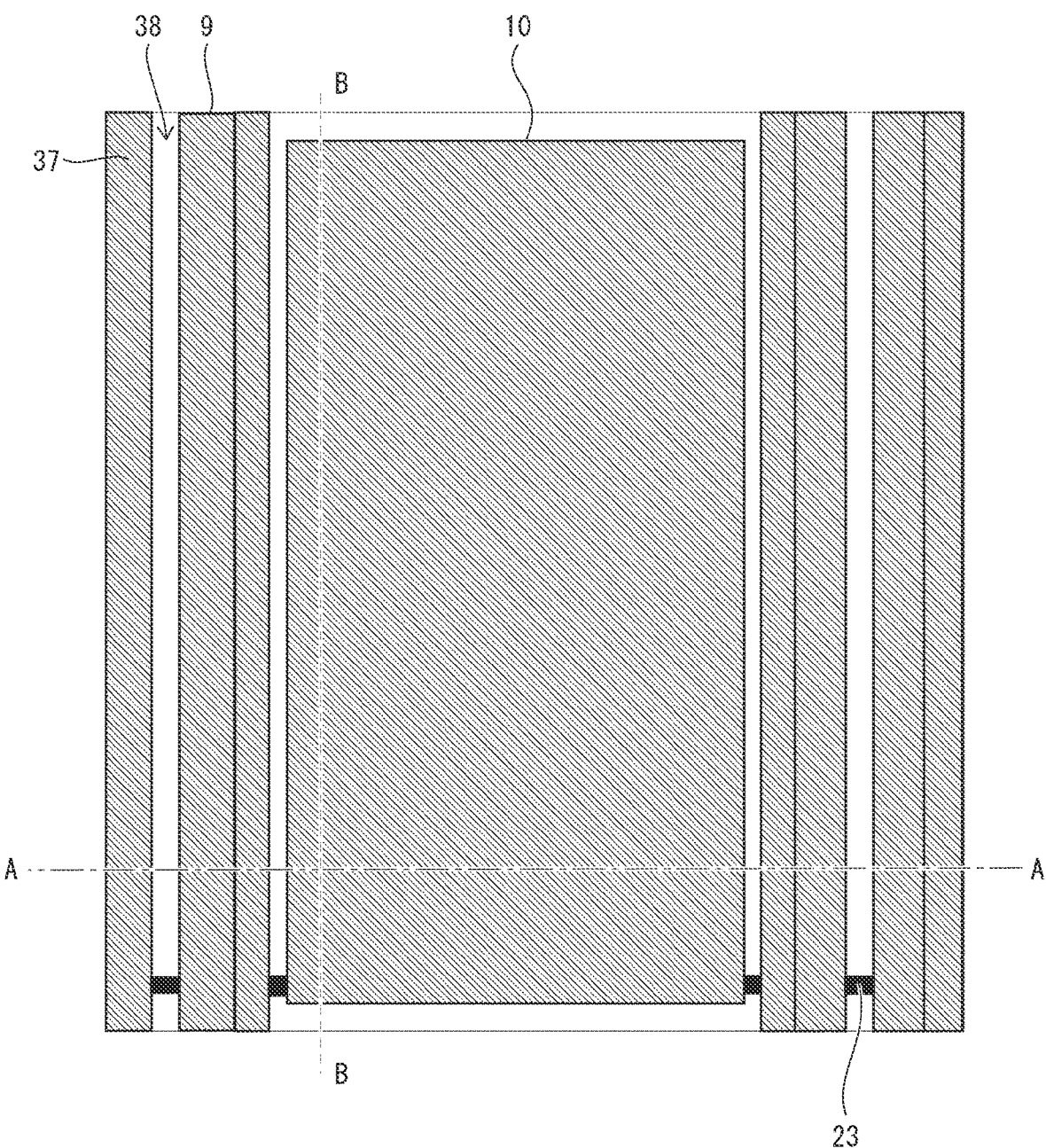
FIG. 15 is a plan view of an example configuration of the light-emitting structure according to the fourth embodiment of the disclosure.
Figure 16:
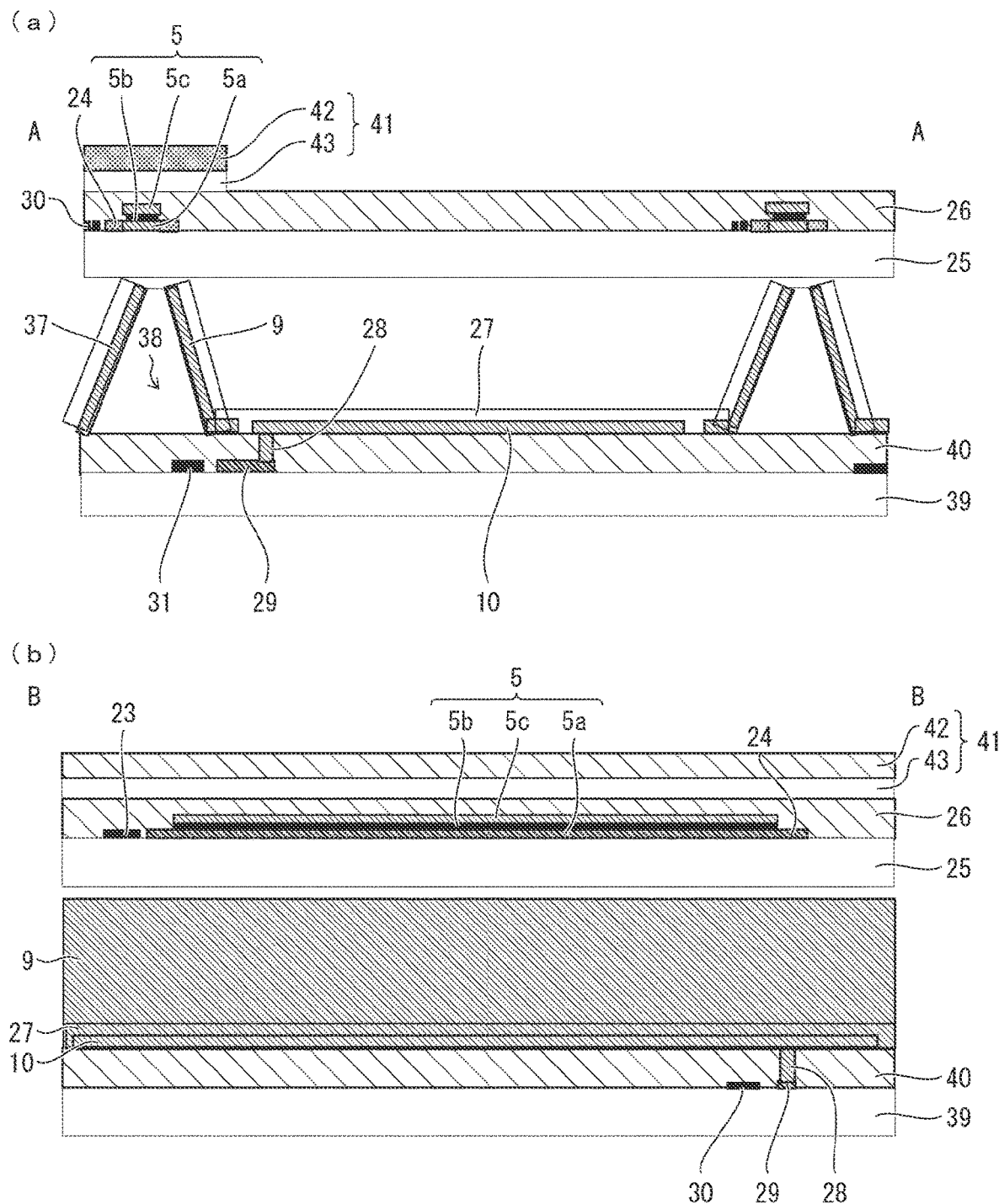
FIG. 16(a) is a sectional view taken along line A-A in FIG. 15.
FIG. 16(b) is a sectional view taken along line B-B in FIG. 15.

FIG. 15 is a plan view of an example configuration of the light-emitting structure 104. FIG. 16(a) is a sectional view taken along line A-A in FIG. 15, and FIG. 16(b) is a sectional view taken along line B-B in FIG. 15. FIG. 16(a) and FIG. 16(b) illustrate an example configuration of the first substrate 1 and second substrate 2 as well as the individual components mounted thereon.

Like the light-emitting structure 102', the light-emitting structure 104 is also structured such that the second electrode 10 and the TFT 29 are connected together via the through-hole 28. The second electrode 10, the through-hole 28, and the TFT 29 are formed on and in the base material 39 and the insulating layer 40.

The optical member 41 in FIG. 16(a) and FIG. 16(b) has a polarizing layer 42 and a λ/4 wavelength layer 43. The optical member 41 is provided immediately above the first light-emitting element 5 (to be specific, in the second direction D2, which is substantially orthogonal to the main surface of the first substrate 1) on the insulating layer 26. The optical member 41 is structured such that the λ/4 wavelength layer 43 and the polarizing layer 42 are stacked in the stated order on the insulating layer 26. The optical member 41 may have a color filter having a property corresponding to the color of light that is emitted by the first light-emitting element 5.

The first substrate 1 preferably has a thickness of 20 μm or smaller and more desirably has a thickness of 10 μm or smaller. This can reduce parallax in the light-emitting structure 104 that results from the thickness of the first substrate 1. An example method of setting the thickness of the first substrate 1 at 20 μm or smaller is a laser liftoff process.

Fifth Embodiment

FIG. 17 is a schematic sectional view of a configuration of a light-emitting structure 105 according to a fifth embodiment of the disclosure. Differences between the light-emitting structure 105 and the light-emitting structure 103 will be mainly described.

The light-emitting structure 105 is structured such that the light-emitting portion 7 has a second light-emitting element 44 and a second-light-emitting-element driving circuit 45 provided on the second substrate 2. The second-light-emitting-element driving circuit 45 is a circuit that drives the second light-emitting element 44. The second light-emitting element 44 and the second-light-emitting-element driving circuit 45 respectively have a configuration similar to that of the first light-emitting element 5, and a configuration similar to that of the first-light-emitting-element driving circuit 6. A light-blocking layer may be inserted between the first light-emitting element 5 and the second light-emitting element 44. The light-emitting structure 105 enables display of a display pattern that is different between both sides of a display device. A possible example is right-and-left reverse display on the front and the back.

An example circuit configuration in the light-emitting structure 105 including the first light-emitting element 5, the first-light-emitting-element driving circuit 6, the first electrode 9, and the first-electrode driving circuit 14 is the same as that illustrated in FIG. 2. The light-emitting structure 105 is structured such that the first light-emitting element 5, the first-light-emitting-element driving circuit 6, the first electrode 9, and the first-electrode driving circuit 14 are all provided on the first substrate 1.

An example circuit configuration of the second light-emitting element 44 and second-light-emitting-element driving circuit 45 in the light-emitting structure 105 is similar to that of the first light-emitting element 5 and first-light-emitting-element driving circuit 6 illustrated in FIG. 2. The light-emitting structure 105 is structured such that the second light-emitting element 44 and the second-light-emitting-element driving circuit 45 are provided on the second substrate 2.

Figure 18:
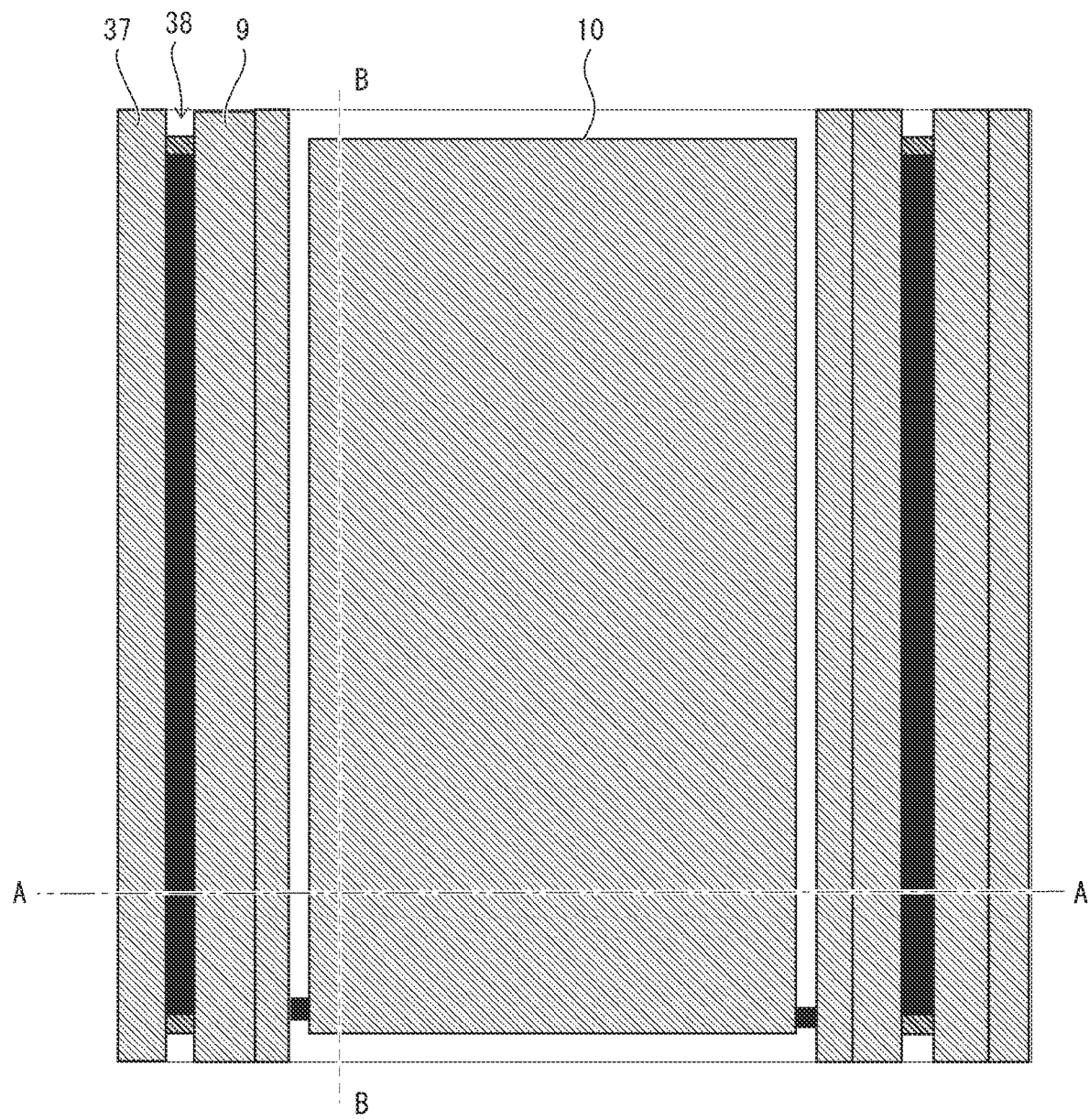
FIG. 18 is a plan view of an example configuration of the light-emitting structure according to the fifth embodiment of the disclosure.

FIG. 18 is a plan view of an example configuration of the light-emitting structure 105. FIG. 19(a) is a sectional view taken along line A-A in FIG. 18, and FIG. 19(b) is a sectional view taken along line B-B in FIG. 18. FIG. 19(a) and FIG. 19(b) illustrate an example configuration of the first substrate 1 and second substrate 2 as well as the individual components mounted thereon.

Like the light-emitting structure 103, the light-emitting structure 105 is also structured such that the second electrode 10 and the TFT 29 are connected together via the through-hole 28. The TFT 29 is formed on the base material 25, and the second electrode 10 and the through-hole 28 are formed on and in the insulating layer 26.

Figure 19:
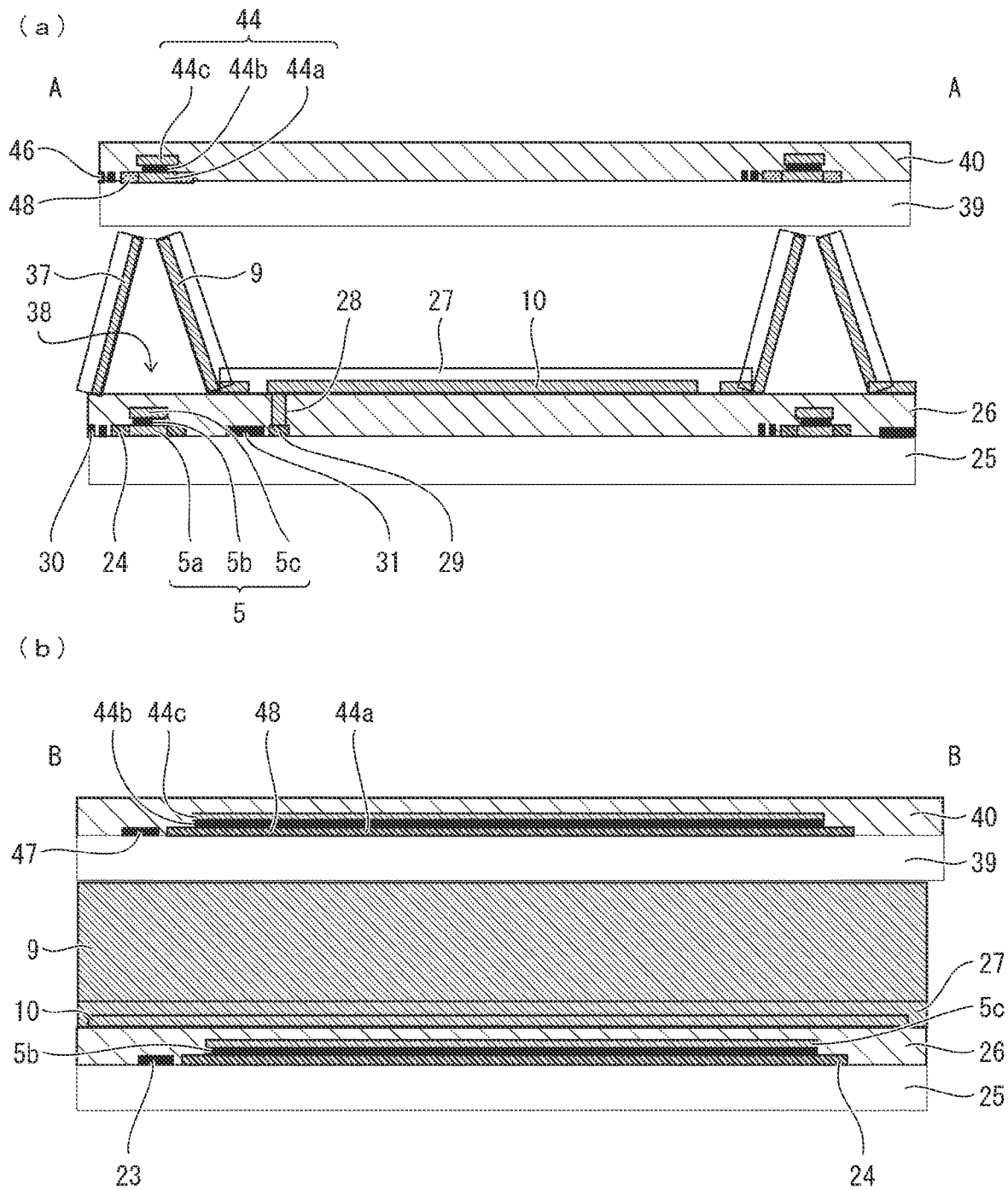
FIG. 19(a) is a sectional view taken along line A-A in FIG. 18.
FIG. 19(b) is a sectional view taken along line B-B in FIG. 18.

In FIG. 19(*a*) and FIG. 19(*b*), a source bus line 46, a gate bus line 47, and a TFT 48 are formed on the base material 39. The second light-emitting element 44 has an anode 44*a* connected to the TFT 48, an electroluminescence layer 44*b*, and a cathode 44*c*. The base material 39 with the TFT 48 and other components are formed thereon corresponds to the second substrate 2.

The first substrate 2 preferably has a thickness of 20 μm or smaller and more desirably has a thickness of 10 μm or smaller. This can reduce parallax in the light-emitting structure 105 that results from the thickness of the second substrate 2. An example method of setting the thickness of the second substrate 2 at 20 μm or smaller is a laser liftoff process.

Sixth Embodiment

FIG. 20 is a schematic sectional view of a configuration of a light-emitting structure 106 according to a sixth embodiment of the disclosure. Differences between the light-emitting structure 106 and the light-emitting structure 103 will be mainly described.

The light-emitting structure 106 includes the following: the first substrate 1 and the second substrate 2 facing each other; and the plurality of first colored particles (colored particles) 4 contained in the space 3 between the first substrate 1 and second substrate 2. The space 3 is filled with a transparent insulating liquid for instance.

The light-emitting structure 106 includes a polymer-dispersed liquid crystal 49, a driving circuit portion 51 having a liquid-crystal driving circuit 50, and a transparent portion 52. The polymer-dispersed liquid crystal 49 is provided on the first substrate 1. The liquid-crystal driving circuit 50 is a circuit provided on the first substrate 1, and that drives the polymer-dispersed liquid crystal 49. The transparent portion 52 is disposed in the first direction D1, which is along the main surface of the first substrate 1 with respect to the driving circuit portion 51. Each of the driving circuit portion 51 and transparent portion 52 includes one end to the other end of the light-emitting structure 106 in the second direction D2, which is substantially orthogonal to the main surface of the first substrate 1.

The light-emitting structure 106 includes the first electrode 9 provided in the driving circuit portion 51, and the transparent second electrode 10 provided in the transparent portion 52.

The light-emitting structure 106 is capable of switching between a light-transmitting state of the transparent portion 52 and a light-blocking state of the transparent portion 52. The light-transmitting state of the transparent portion 52 is a state in which the first electrode 9 attracts the plurality of first colored particles 4 and is equivalent to the foregoing light-transmitting state of the first transparent portion 8 with the first transparent portion 8 replaced with the transparent portion 52. The light-blocking state of the transparent portion 52 is a state in which the second electrode 10 attracts the plurality of first colored particles 4 and is equivalent to the foregoing light-blocking state of the first transparent portion 8 with the first transparent portion 8 replaced with the transparent portion 52.

The foregoing configuration can minimize components that can block light that is about to pass through the transparent portion 52 during the light-transmitting state of the transparent portion 52. Accordingly, a see-through display device capable of bright display can be achieved.

Furthermore, using the plurality of first colored particles 4 as a material for switching between the light-transmitting state and light-blocking state of the transparent portion 52 offers low electric power for moving this material and facilitates displacement control of the material when compared with an instance where a fluid is used as the material, and thus, this usage has the effect of capable of shortening switching time.

The light-emitting structure 106 emits light by the use of the scattering of the polymer-dispersed liquid crystal 49. Light is introduced through light-guiding from an end face, and irradiation from an oblique front face. The polymer-dispersed liquid crystal 49 does not generate heat; hence, using the light-emitting structure 106 can achieve a display device with less display non-uniformity. The insulating layer 11 covers the first-electrode driving circuit 14.

Figure 21:
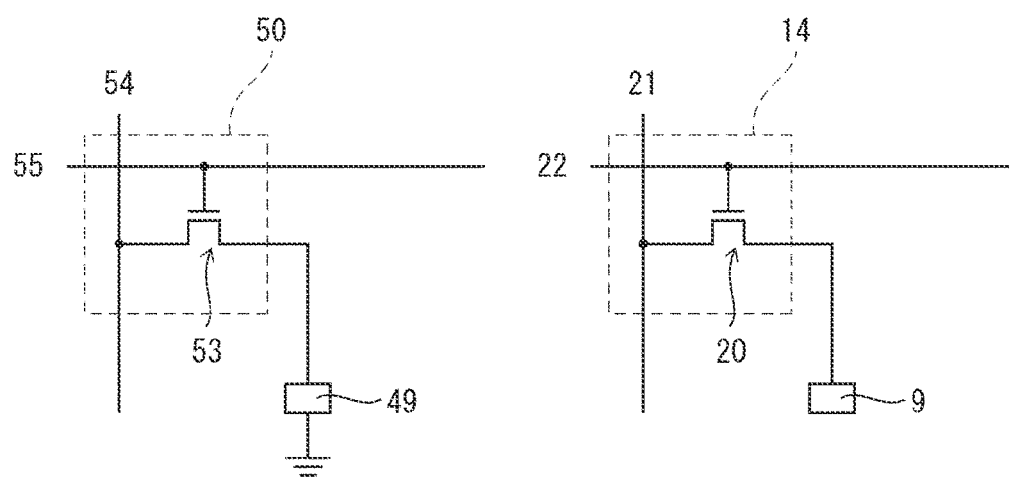
FIG. 21 illustrates an example circuit configuration in the light-emitting structure according to the sixth embodiment of the disclosure, including a polymer-dispersed liquid crystal, a liquid-crystal driving circuit, the first electrode, and the first-electrode driving circuit.

FIG. 21 illustrates an example circuit configuration in the light-emitting structure 106 including the polymer-dispersed liquid crystal 49, the liquid-crystal driving circuit 50, the first electrode 9, and the first-electrode driving circuit 14.

The polymer-dispersed liquid crystal 49 is connected to a signal line 54 via a transistor 53. The transistor 53 has a gate connected to a gate line 55. The liquid-crystal driving circuit 50 has the transistor 53.

Figure 22:
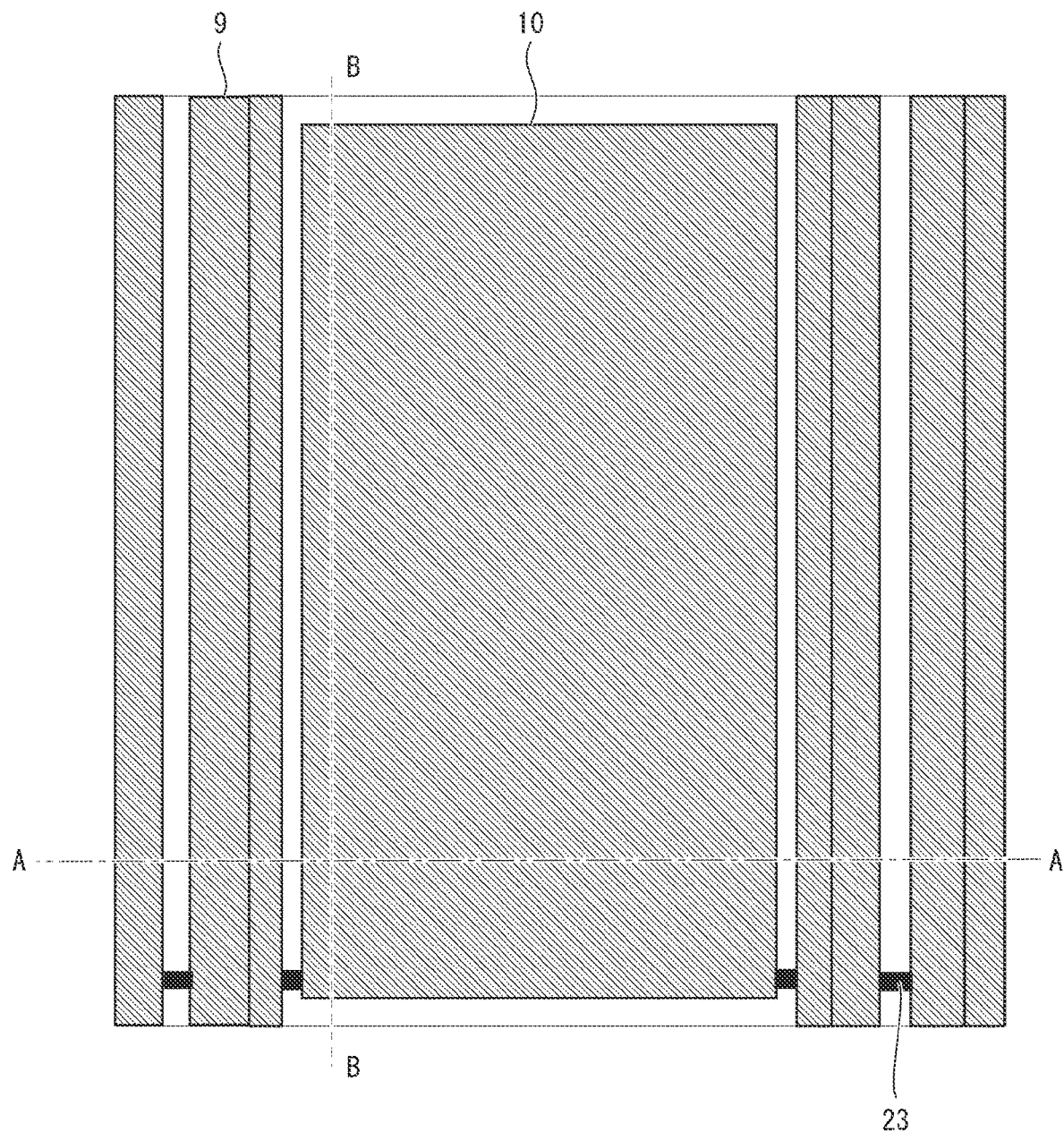
FIG. 22 is a plan view of an example configuration of the light-emitting structure according to the sixth embodiment of the disclosure.
Figure 23:
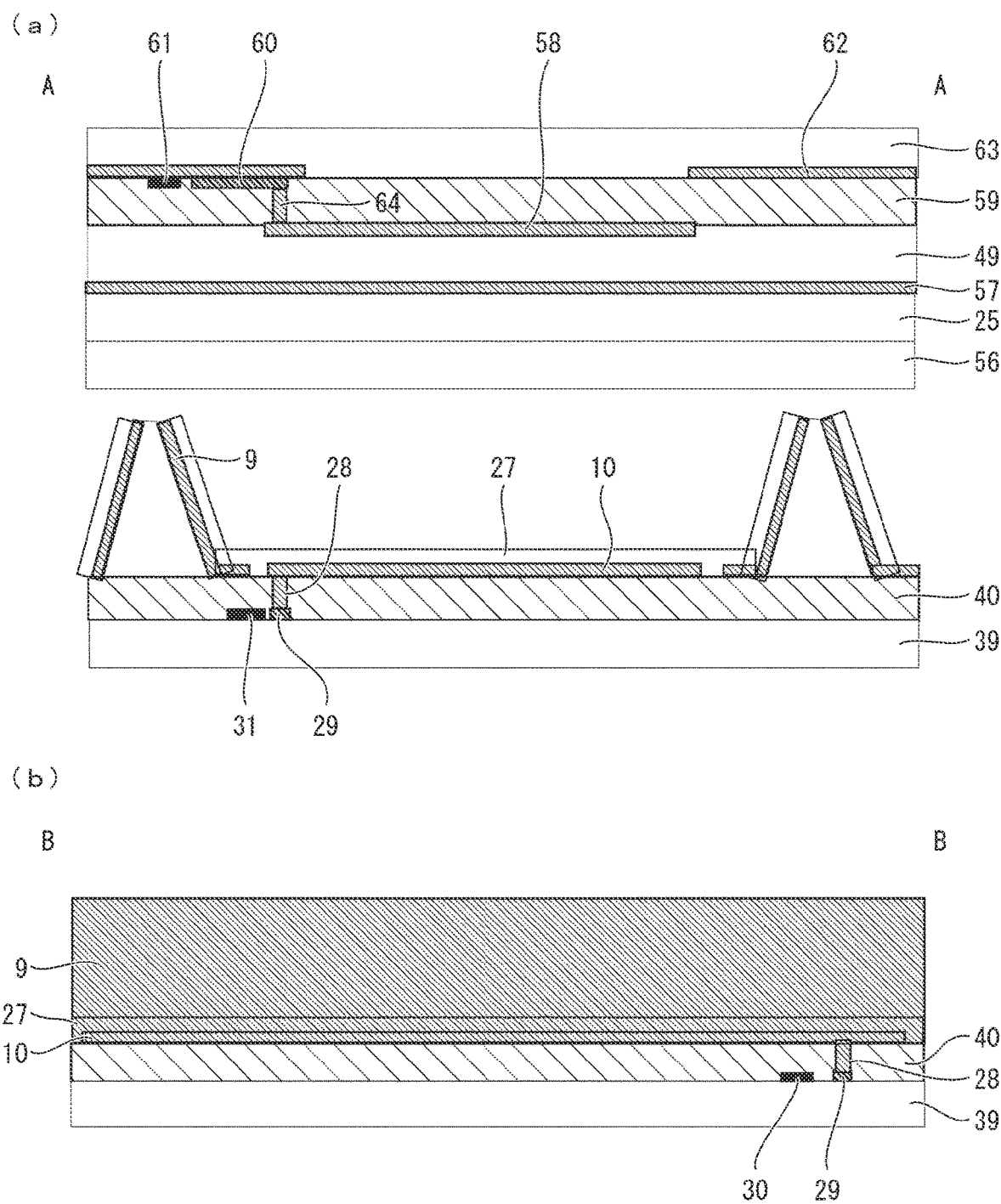
FIG. 23(a) is a sectional view taken along line A-A in FIG. 22.
FIG. 23(b) is a sectional view taken along line B-B in FIG. 22.

FIG. 22 is a plan view of an example configuration of the light-emitting structure 106. FIG. 23(*a*) is a sectional view taken along line A-A in FIG. 22, and FIG. 23(*b*) is a sectional view taken along line B-B in FIG. 22. FIG. 23(*a*) and FIG. 23(*b*) illustrate an example configuration of the first substrate 1 and second substrate 2 as well as the individual components mounted thereon.

Like the light-emitting structure 103, the light-emitting structure 106 is also structured such that the second electrode 10 and the TFT 29 are connected together via the through-hole 28. The second electrode 10, the through-hole 28, and the TFT 29 are formed on and in the base material 39 and the insulating layer 40.

As illustrated in FIG. 23(*a*), a low-refractive-index layer 56, the base material 25 made of ITO for instance, a common electrode 57, the polymer-dispersed liquid crystal 49, a driving electrode 58, an insulating layer 59, a TFT 60, a source bus line 61, a light-guiding mirror aperture 62, and a base material 63 are stacked in the stated order. The driving electrode 58 is connected to the TFT 60 via a through-hole 64 formed in the insulating layer 59.

The base material 25 preferably has a thickness of 20 μm or smaller and more desirably has a thickness of 10 μm or smaller. This can reduce parallax in the light-emitting structure 106 that results from the thickness of the base material 25. An example method of setting the thickness of the base material 25 at 20 μm or smaller is a laser liftoff process.

Seventh Embodiment

Figure 24:
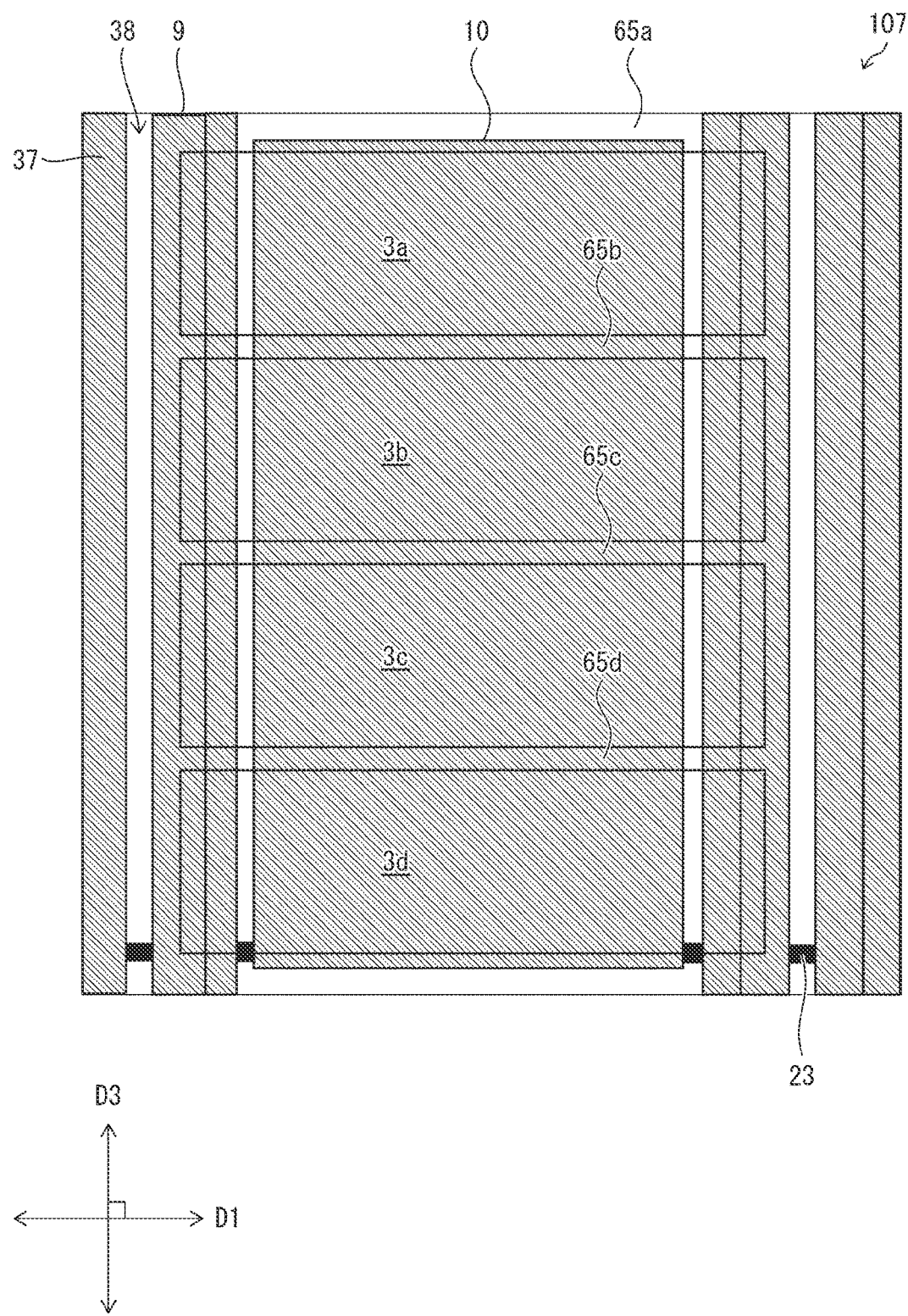
FIG. 24 is a schematic plan view of a configuration of a main part of a light-emitting structure according to a seventh embodiment of the disclosure.

FIG. 24 is a schematic plan view of a configuration of a main part 107 of a light-emitting structure according to a seventh embodiment of the disclosure. In FIG. 24, components not directly illustrated in FIG. 24 will be denoted as appropriate by signs in the other drawings.

In the main part 107, the space 3 is divided into a plurality of (herein, four) regions 3*a*, 3*b*, 3*c*, and 3*d* by at least one (herein, four) partition member 65*a*, 65*b*, 65*c*, or 65*d* in a third direction D3. The third direction D3 is a direction along the main surface of the first substrate 1 and is a direction perpendicular to the first direction D1 (i.e., a direction in which the light-emitting portion 7 and the first transparent portion 8 are arranged, or a direction in which the driving circuit portion 51 and the transparent portion 52 are arranged). Moreover, the plurality of first colored particles 4 are contained dispersedly in the plurality of regions 3a, 3b, 3c, and 3d. It is noted that the third direction D3 corresponds to the direction of an electric field in the main part 107. This can reduce imbalance in the distribution of the plurality of first colored particles 4 in the third direction D3. When the second electrode 10 is the second electrode 10a or 10b (see FIG. 5) including the trunk 32 and branches 33, the interval between two of the partition members 65a, 65b, 65c, and 65d adjacent to each other may be an integral multiple of the interval between two branches 33 adjacent to each other. Further, the height of each of the partition members 65a, 65b, 65c, and 65d is desirably as large as the distance between the first substrate 1 and second substrate 2.

The foregoing characteristic features of the main part 107 may be further applied also to the aforementioned light-emitting structures other than the light-emitting structure 101.

Others

The first electrode 9, and a plurality of electrodes including the third electrode 37 when a light-emitting structure is provided with the third electrode 37, may be driven collectively or individually. When provided for each of many pixels in a display device, these many first electrodes 9 may be driven independently of each other in the unit of one or more pixels (e.g., for each pixel) in the display device. This holds true for the third electrode 37.

Figure 25:
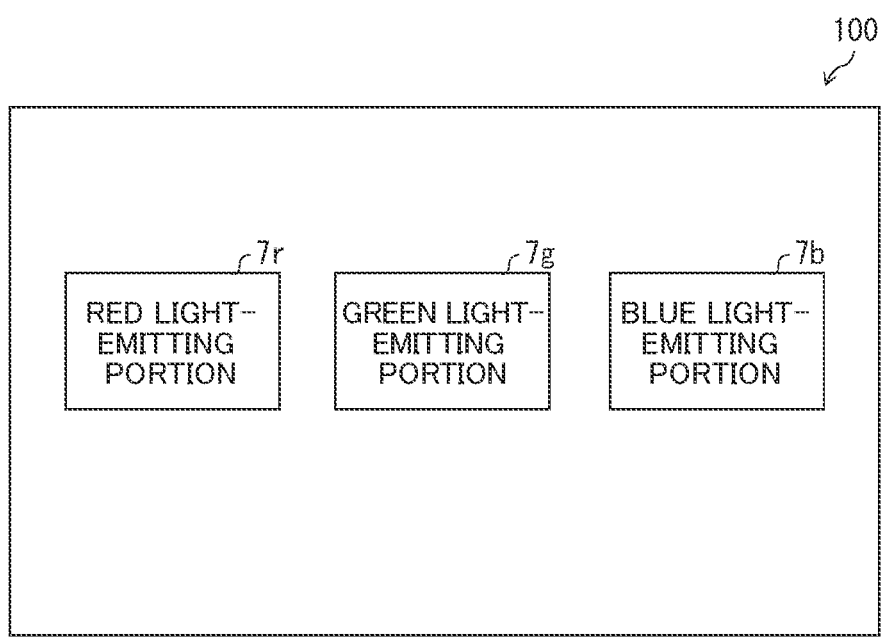
FIG. 25 illustrates an example display device provided with a light-emitting structure.

The foregoing light-emitting structures are applicable to a display device. FIG. 25 illustrates an example of the display device. A display device 100 includes a red light-emitting portion 7r, a green light-emitting portion 7g, and a blue light-emitting portion 7b. Forming the individual red light-emitting portion 7r, green light-emitting portion 7g, and blue light-emitting portion 7b by the use of a single light-emitting portion 7 or a single polymer-dispersed liquid crystal 49 can achieve the display device 100. An example of the light-emitting portion 7 that constitutes any one of the red light-emitting portion 7r, green light-emitting portion 7g, and blue light-emitting portion 7b is a light-emitting portion having a self-luminous element (e.g., an OLED, a QLED, and a μLED) as the first light-emitting element 5.

Summary

A display device according to a first aspect of the disclosure includes the following: a first substrate and a second substrate facing each other; a plurality of first colored particles contained in a space between the first substrate and the second substrate; a light-emitting portion having a first light-emitting element provided on the first substrate, and a first-light-emitting-element driving circuit provided on the first substrate and configured to drive the first light-emitting element; a first transparent portion disposed in a direction along a main surface of the first substrate with respect to the light-emitting portion; a first electrode provided in the light-emitting portion; and a second electrode provided in the first transparent portion and being transparent, wherein the display device is capable of switching between a light-transmitting state of the first transparent portion in which the first electrode attracts the plurality of first colored particles, and a light-blocking state of the first transparent portion in which the second electrode attracts the plurality of first colored particles.

The display device according to a second aspect of the disclosure is structured, in the first aspect, such that a pitch between the first electrode and the second electrode along the main surface of the first substrate is 80 μm or smaller.

The display device according to a third aspect of the disclosure is structured, in the first or second aspect, such that two of the plurality of first colored particles move in mutually different directions during the switching between the light-transmitting state of the first transparent portion and the light-blocking state of the first transparent portion.

The display device according to a fourth aspect of the disclosure is structured, in any one of the first to third aspects, such that the light-emitting portion has a protrusion protruding in a direction substantially orthogonal to the main surface of the first substrate in the space.

The display device according to a fifth aspect of the disclosure is structured, in the fourth aspect, such that the protrusion includes at least a part of the first electrode.

The display device according to a sixth aspect of the disclosure includes the following in any one of the first to fifth aspects: a plurality of second colored particles contained in the space; a second transparent portion disposed opposite the first transparent portion with respect to the light-emitting portion; and a third electrode provided in the light-emitting portion, wherein the display device is capable of switching into a light-transmitting state of the second transparent portion in which the third electrode attracts the plurality of second colored particles.

The display device according to a seventh aspect of the disclosure is structured, in the sixth aspect, such that a space between the first electrode and the third electrode is formed in a direction substantially orthogonal to the main surface of the first substrate with respect to the first light-emitting element.

The display device according to an eighth aspect of the disclosure is structured, in any one of the fourth to seventh aspects, such that the first substrate has a thickness of 20 μm or smaller.

The display device according to a ninth aspect of the disclosure is structured, in any one of the first to eighth aspects, such that no TFT is formed on the second substrate.

The display device according to a tenth aspect of the disclosure is structured, in any one of the first to ninth aspects, such that the light-emitting portion has an optical member for enhancing a contrast of light emitted by the first light-emitting element.

The display device according to an eleventh aspect of the disclosure is structured, in any one of the first to tenth aspects, such that the light-emitting portion has a second light-emitting element provided on the second substrate.

The display device according to a twelfth aspect of the disclosure is structured, in any one of the first to eleventh aspects, such that the first light-emitting element is a self-luminous element.

The display device according to a thirteenth aspect of the disclosure is structured, in any one of the first to twelfth aspects, such that a shape of the second electrode viewed in a direction substantially orthogonal to the main surface of the first substrate includes a trunk, and a branch branched from the trunk.

The display device according to a fourteenth aspect of the disclosure is structured, in any one of the first to thirteenth aspects, such that the space is divided into a plurality of regions by at least one partition member in the direction along the main surface of the first substrate, and the plurality of first colored particles are contained dispersedly in the plurality of regions.

A display device according to a fifteenth aspect of the disclosure includes the following: a first substrate and a second substrate facing each other; a plurality of colored particles contained in a space between the first substrate and the second substrate; a polymer-dispersed liquid crystal provided on the first substrate; a driving circuit portion provided on the first substrate, and having a liquid-crystal driving circuit configured to drive the polymer-dispersed liquid crystal; a transparent portion disposed in a direction along a main surface of the first substrate with respect to the driving circuit portion; a first electrode provided in the driving circuit portion; and a second electrode provided in the transparent portion and being transparent, wherein the display device is capable of switching between a light-transmitting state of the transparent portion in which the first electrode attracts the plurality of colored particles, and a light-blocking state of the transparent portion in which the second electrode attracts the plurality of colored particles.

The display device according to a sixteenth aspect of the disclosure is structured, in the fifteenth aspect, such that the space is divided into a plurality of regions by at least one partition member in the direction along the main surface of the first substrate, and the plurality of colored particles are contained dispersedly in the plurality of regions.

The disclosure is not limited to the foregoing embodiment. Various modifications can be devised within the scope of the claims. An embodiment that is obtained in combination as appropriate with the technical means disclosed in the respective embodiments is also included in the technical scope of the disclosure. Furthermore, combining the technical means disclosed in the respective embodiments can form a new technical feature.

The invention claimed is:

1. A display device comprising:
    a first substrate and a second substrate facing each other;
    a plurality of first colored particles contained in a space between the first substrate and the second substrate;
    a light-emitting portion having a first light-emitting element provided on the first substrate, and a first-light-emitting-element driving circuit provided on the first substrate and configured to drive the first light-emitting element;
    a first transparent portion disposed in a direction along a main surface of the first substrate with respect to the light-emitting portion;
    a first electrode provided in the light-emitting portion; and
    a second electrode provided in the first transparent portion, the second electrode being transparent,
    wherein the display device is capable of switching between a light-transmitting state of the first transparent portion in which the first electrode attracts the plurality of first colored particles and a light-blocking state of the first transparent portion in which the second electrode attracts the plurality of first colored particles.

2. The display device according to claim 1, wherein a pitch between the first electrode and the second electrode along the main surface of the first substrate is 80 μm or smaller.

3. The display device according to claim 1, wherein two of the plurality of first colored particles move in mutually different directions during the switching between the light-transmitting state of the first transparent portion and the light-blocking state of the first transparent portion.

4. The display device according to claim 1, wherein the light-emitting portion has a protrusion protruding in a direction substantially orthogonal to the main surface of the first substrate in the space.

5. The display device according to claim 4, wherein the protrusion includes at least a part of the first electrode.

6. The display device according to claim 1, further comprising:
    a plurality of second colored particles contained in the space;
    a second transparent portion disposed opposite the first transparent portion with respect to the light-emitting portion; and
    a third electrode provided in the light-emitting portion,
    wherein the display device is further capable of switching into a light-transmitting state of the second transparent portion in which the third electrode attracts the plurality of second colored particles.

7. The display device according to claim 6, wherein a space between the first electrode and the third electrode is formed in a direction substantially orthogonal to the main surface of the first substrate with respect to the first light-emitting element.

8. The display device according to claim 4, wherein the first substrate has a thickness of 20 μm or smaller.

9. The display device according to claim 1, wherein no thin-film transistor (TFT) is formed on the second substrate.

10. The display device according to claim 1, wherein the light-emitting portion further has an optical member for enhancing a contrast of light emitted by the first light-emitting element.

11. The display device according to claim 1, wherein the light-emitting portion further has a second light-emitting element provided on the second substrate.

12. The display device according to claim 1, wherein the first light-emitting element is a self-luminous element.

13. The display device according to claim 1, wherein a shape of the second electrode, viewed in a direction substantially orthogonal to the main surface of the first substrate, includes a trunk and a branch that is branched off the trunk.

14. The display device according to claim 1, wherein
    the space is divided into a plurality of regions by at least one partition member in the direction along the main surface of the first substrate, and
    the plurality of first colored particles is contained dispersedly in the plurality of regions.

* * * * *